United States Patent
Li et al.

(10) Patent No.: US 11,694,059 B2
(45) Date of Patent: Jul. 4, 2023

(54) METHOD, APPARATUS, ELECTRONIC DEVICE AND STORAGE MEDIUM FOR PREDICTING USER ATTRIBUTE

(71) Applicant: SAMSUNG ELECTRONICS CO., LTD., Suwon-si (KR)

(72) Inventors: Shuchen Li, Beijing (CN); Guangyu Sun, Beijing (CN); Xuesong Yao, Beijing (CN); Yongheng Zhai, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 139 days.

(21) Appl. No.: 17/018,664

(22) Filed: Sep. 11, 2020

(65) Prior Publication Data
US 2021/0081755 A1    Mar. 18, 2021

(30) Foreign Application Priority Data
Sep. 12, 2019   (CN) .......................... 201910866676.1

(51) Int. Cl.
*G06N 3/04* (2023.01)
*H04L 67/306* (2022.01)
*H04L 67/50* (2022.01)

(52) U.S. Cl.
CPC .............. *G06N 3/04* (2013.01); *H04L 67/306* (2013.01); *H04L 67/535* (2022.05)

(58) Field of Classification Search
None
See application file for complete search history.

(56) References Cited

U.S. PATENT DOCUMENTS 8,375,331 B1    2/2013  Mayers
10,147,041 B2 * 12/2018  Gao ........................ G06N 20/00
(Continued)

FOREIGN PATENT DOCUMENTS

CN    109145932 A    1/2019
CN    109376927 A    2/2019
(Continued)

OTHER PUBLICATIONS

Kim et al. "Predicting Multiple Demographic Attributes with Task Specific Embedding Transformation and Attention Network", Mon, Mar. 25, 2019 06:25:47 UTC, https://arxiv.org/abs/1903.10144, arXiv:1903.10144v1, pp. 1-8 (Year: 2019).*
(Continued)

*Primary Examiner* — Davoud A Zand
(74) *Attorney, Agent, or Firm* — Sughrue Mion, PLLC

(57) ABSTRACT

The embodiment of the present disclosure provides a method, an apparatus, an electronic device, and a storage medium for predicting user attribute. The method comprises acquiring an input of demographic-related information; determining features corresponding to the input of the demographic-related information and a weight corresponding to each feature, where the features comprise a single feature corresponding to each input of the demographic-related information, and/or a cross feature between the at least two single features; predicting user attribute according to each feature and its corresponding weight. Based on the solution provided by the embodiment of the present disclosure, the accuracy on the prediction of the user attribute can be effectively improved.

20 Claims, 10 Drawing Sheets

(56) References Cited

U.S. PATENT DOCUMENTS

| | | | |
|---|---|---|---|
| 10,157,351 B1* | 12/2018 | Rastogi | G06F 3/0484 |
| 10,216,551 B1 | 2/2019 | Jha et al. | |
| 2012/0310739 A1 | 12/2012 | Watfa et al. | |
| 2014/0129500 A1* | 5/2014 | Nice | G06N 5/02 706/46 |
| 2014/0280214 A1* | 9/2014 | Han | G06F 16/24575 707/748 |
| 2015/0100688 A1 | 4/2015 | Richardson et al. | |
| 2016/0308997 A1 | 10/2016 | Zhang et al. | |
| 2017/0017886 A1* | 1/2017 | Gao | G06Q 30/0241 |
| 2017/0235846 A1* | 8/2017 | Atlas | G06F 16/24568 707/737 |
| 2018/0082191 A1* | 3/2018 | Pearmain | G06N 7/01 |
| 2018/0365384 A1 | 12/2018 | Althoff et al. | |
| 2019/0073580 A1* | 3/2019 | Dzhulgakov | G06N 3/084 |
| 2019/0073581 A1* | 3/2019 | Chen | G06Q 30/0251 |
| 2019/0073590 A1* | 3/2019 | Wu | G06F 9/00 |
| 2019/0114537 A1* | 4/2019 | Wesolowski | G06N 3/105 |
| 2020/0204643 A1 | 6/2020 | Zhou et al. | |

FOREIGN PATENT DOCUMENTS

| | | |
|---|---|---|
| KR | 10-2015-0105830 A | 9/2015 |
| KR | 10-2018-0097948 A | 9/2018 |
| WO | 2015085961 A1 | 6/2015 |
| WO | 2018227823 A1 | 12/2018 |

OTHER PUBLICATIONS

Yongsheng et al., "An Efficient Deep Learning Model to Infer User Demographic Information From Ratings", Jan. 1, 2019, IEEE, IEEE Access (vol. 7, pp. 53125-53135) (Year: 2019).*

Shang et al., "Demographic Inference via Knowledge Transfer in Cross-Domain Recommender Systems", Feb. 1, 2019, IEEE, 2018 IEEE International Conference on Data Mining (ICDM) (pp. 1218-1223) (Year: 2019).*

International Search Report (PCT/ISA/210) dated Nov. 30, 2020 by the International Searching Authority in counterpart International Patent Application No. PCT/KR2020/012356.

Communication dated Jun. 28, 2022 issued by the European Patent Office in counterpart European Application No. 20863662.1.

Communication dated Jan. 23, 2023 issued by European Patent Office in counterpart European Application No. 20863662.1.

* cited by examiner

METHOD, APPARATUS, ELECTRONIC DEVICE AND STORAGE MEDIUM FOR PREDICTING USER ATTRIBUTE

CROSS-REFERENCE TO RELATED APPLICATION(S)

This application is based on and claims priority under 35 U.S.C. § 119 to Chinese Patent Application No. 201910866676.1, filed on Sep. 12, 2019, in the Chinese Intellectual Property Office, the disclosure of which is incorporated by reference herein in its entirety.

BACKGROUND

1) Field

The present disclosure relates to the field of computer technology, and in particular, relates to a method, an apparatus, an electronic device and a storage medium for predicting one or more user attributes.

2) Description of Related Art

With the rapid development of Internet technologies, user profiles have been increasingly valued by Internet vendors and terminal manufacturers. When constructing the user profile, the prediction of an attribute of a user is also indispensable, for example, predicting one or more of: age, gender and/or other demographic information of the user to construct a more accurate user profile is important. In the related art, although there are already many schemes for predicting user attributes, the prediction accuracy of these schemes still needs to be improved.

SUMMARY

The purpose of the application is to provide a method, an apparatus, an electronic device and a storage medium for predicting user attribute, so as to improve the accuracy of predicting user attribute. The solution provided by the embodiment of the present application is as follows:

In a first aspect, an embodiment of the present application provides a method for predicting user attribute, comprising: acquiring an input of user's related information; determining features corresponding to the input of the user's related information and a weight corresponding to each feature, wherein features corresponding to the input of the user's related information comprises: a single feature corresponding to each input of the user's related information, and/or a cross feature between at least two single features; and predicting the user attribute based on each feature and its corresponding weight.

In a second aspect, an embodiment of the present application provides a method for predicting user attribute, comprising: acquiring the input of the user's related information, wherein the input of the user's related information comprises user's sleep pattern, and/or device usage information of the user on terminal device; and predicting the user attribute according to the input of the user's related information.

In a third aspect, an embodiment of the present application provides an apparatus for predicting user attribute, comprising: an input information acquiring module configured to acquire the input of the user's related information; a feature determining module configured to determine features corresponding to the input of the user's related information and weight corresponding to each feature, wherein features corresponding to the input of the user's related information comprises: a single feature corresponding to the input of the user's related information, and/or a cross feature between the at least two single features; and an attribute predicting module configured to predict the user attribute according to each feature and its corresponding weight.

In a fourth aspect, an embodiment of the present application provides an apparatus for predicting user attribute, comprising: an input information acquiring module configured to acquire the input of user's related information, wherein the input of the user's related information comprises a user's sleep pattern, and/or device usage information of the user on terminal device; and an attribute predicting module configured to predict the user attribute according to the input of the user's related information.

In a fifth aspect, an embodiment of the present application provides an electronic device, comprising memory and processor; wherein the memory stores computer program; the processor is configured to invoke the computer program to perform the method provided by the first aspect and/or the second aspect of the present application.

In a sixth aspect, an embodiment of the present application provides a computer readable storage medium, wherein the storage medium stores computer program, when executed by processor, the computer program implements the method provided in any embodiment of the present application.

According to an embodiment, a computer-implemented method may comprising: obtaining demographic-related information of a user; identifying one or more features corresponding to the demographic-related information of the user and identifying one or more weights corresponding to the one or more features, wherein the one or more features comprise at least one of: a single feature type that corresponds to the demographic-related information, or a cross feature type that corresponds to at least two single feature types, the at least two single feature types including a first single feature type that is different from a second single feature type; and predicting a user attribute based on the one or more features and the one or more weights corresponding to the one or more features.

The identifying the one or more weights corresponding to the one or more features may comprise: identifying, by using a deep neural network, one or more inputs for the one or more weights by inputting the one or more features into the deep neural network; and identifying the one or more weights corresponding to the one or more features according to the inputting of the one or more weights corresponding to the one or more features.

The identifying the one or more inputs for the one or more weights corresponding to the one or more features may comprise: determining one or more input vectors corresponding to the one or more features; and identifying the one or more inputs for the one or more weights based on the one or more input vectors corresponding to the one or more features.

The determining the one or more input vectors corresponding to the one or more features may comprise at least one of: in a case that the one or more features are the single feature type, determining the one or more input vectors according to the single feature type and a latent vector corresponding to the single feature type; or in a case that the one or more features are the cross feature type, determining the one or more single feature type of input vectors according to the two or more single feature types and two or more latent vectors corresponding to the two or more single feature types, and determining at least two cross-feature input vectors, as the one or more input vectors corresponding to the cross feature type of feature.

The one or more inputs for the one or more weights may include an input matrix capable of characterizing a relationship between elements of input vectors.

The determining the one or more inputs for the one or more weights corresponding to the one or more features according to the one or more input vectors may comprise: performing an outer product operation on the one or more input vectors corresponding to the one or more features; and determining the result of the outer product operation as the one or more inputs of the one or more weights corresponding to the one or more features.

The determining the one or more weights corresponding to the one or more features according to the one or more inputs for the one or more weights corresponding to the one or more features may comprise: determining the one or more weights corresponding to the one or more features according to the one or more inputs for the one or more weights being input through the deep neural network, which is a weight-based learning network.

The weight-based learning network may comprise: a feature extraction module that performs feature extraction on an input of weight, and a weight learning module that predicts a weight corresponding to a feature according to the feature extraction.

According to an embodiment, the method may further include at least one of: the feature extraction module performs feature extraction on the input of weight by using at least two convolution parameters; or the weight learning module includes at least two fully connected layers that are cascaded in sequence.

The predicting the user attribute may comprise: determining one or more weighted features, according to the one or more weights corresponding to the one or more features; and predicting the user attribute based on the one or more weighted features.

The demographic-related information may comprise one or more of: a sleep pattern of the user, or device usage information of the user on a terminal device.

The device usage information may comprise at least one of: a usage time, a usage duration, and a number of uses.

The determining the one or more features corresponding to the one or more inputs may comprise: jointing a representation vector corresponding to the sleep pattern of the user or corresponding to the device usage information to obtain the one or more single feature types corresponding to the demographic-related information.

The user attribute may comprise at least one of: an age of the user or a gender of the user.

The demographic-related information may comprise at least one of: a sleep pattern of the user, or device usage information of the user on a terminal device, the device usage information including at least one of usage time, usage duration, or a number of uses.

The demographic-related information may include a sleep pattern of the user, and the computer-implemented method may further comprise: obtaining the sleep pattern of the user by: obtaining status information of a terminal device of the user, the status information including at least one of: screen off/on times of the terminal device or motion information of the terminal device; and determining the sleep pattern of the user, including a wake-up time and a bedtime, based on the status information of the terminal device; and predicting the user attribute based on the determined sleep pattern of the user.

The demographic-related information may include a sleep pattern of the user, and the computer-implemented method may further comprise: obtaining the sleep pattern of the user by: obtaining at least one of application operation behavior data or web browsing data of the user; and determining the sleep pattern of the user, including a wake-up time and a bedtime, based on the at least one of the application operation behavior data or the web browsing data of the user; and predicting the user attribute based on the determined sleep pattern of the user.

The demographic-related information may include a sleep pattern of the user, and the computer-implemented method may further comprise: obtaining the sleep pattern of the user by: obtaining at least one of application operation behavior data of the user, web browsing data of the user or status information of a terminal device of the user, the status information including at least one of: screen off/on times of the terminal device or motion information of the terminal device; and determining the sleep pattern of the user, including a wake-up time and a bedtime, based on the at least one of the application operation behavior data of the user, the web browsing data of the user, or the status information of the terminal device; and predicting the user attribute based on the determined sleep pattern of the user.

According to an embodiment, an electronic device may comprise: a network communication interface; and a processor configured to: obtain demographic-related information of a user; identify one or more features corresponding to the demographic-related information of the user and identifying one or more weights corresponding to the one or more features, wherein the one or more features comprise at least one of: a single feature type that corresponds to the demographic-related information, or a cross feature type that corresponds to at least two single feature types, the at least two single feature types including a first single feature type that is different from a second single feature type; and predict a user attribute based on the one or more features and the one or more weights corresponding to the one or more features.

According to an embodiment, a non-transitory computer readable storage medium may store a computer program, which when executed by a processor, causes the processor to: obtain demographic-related information of a user; identify one or more features corresponding to the demographic-related information of the user and identifying one or more weights corresponding to the one or more features, wherein the one or more features comprise at least one of: a single feature type that corresponds to the demographic-related information, or a cross feature type that corresponds to at least two single feature types, the at least two single feature types including a first single feature type that is different from a second single feature type; and predict a user attribute based on the one or more features and the one or more weights corresponding to the one or more features.

The advantages of the technical solutions provided by the present disclosure will be described in detail below with reference to the specific embodiments and the accompanying drawings, and are not described herein.

BRIEF DESCRIPTION OF THE DRAWINGS

In order to more clearly illustrate the technical solutions in the embodiments of the present specification, the drawings used in the description of the embodiments of the present disclosure will be briefly described below.

DETAILED DESCRIPTION

Figure 1:
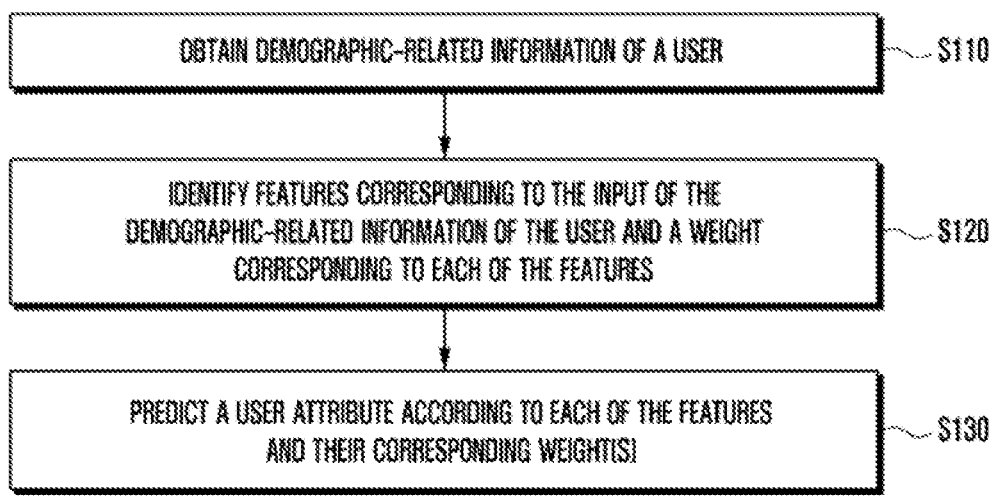
FIG. 1 is a schematic flowchart diagram illustrating a method for predicting user attribute according to an embodiment of the present disclosure.

The embodiments of the present disclosure are described in detail below, and the examples of the embodiments are illustrated in the drawings, wherein the same or similar reference numerals are used to refer to the same or similar elements or elements having the same or similar functions. The embodiments described below with reference to the accompanying drawings are exemplary, are intended to interpret this disclosure only, and are not to be construed as a limitation to the disclosure.

It should be understood by those skilled in the art that singular forms "a", "an", "the", and "said" may be intended to include plural forms as well, unless otherwise stated. It should be further understood that terms "comprise/comprising" used herein specify the presence of the features, integers, steps, operations, elements and/or components, but not excluding the presence or addition of one or more other features, integers, steps, operations, elements, components, and/or combinations thereof. It should be understood that when a component is referred to as being "connected to" or "coupled to" another component, it may be directly connected or coupled to other elements or provided with intervening elements therebetween. In addition, "connected to" or "coupled to" as used herein may include wireless connection or coupling. As used herein, term "and/or" includes all or any of one or more associated listed items or combinations thereof.

In order to better explain and understand the solutions provided by the embodiments of the present disclosure, the related technologies of the present disclosure are briefly described below.

User profiles, also known as user roles, can be seen as virtual representations of real users, which were initially applied in the e-commerce field. In the context of the era of big data, each specific information of a user can be abstracted into a label, and the user profiles can be embodied by these labels, or these labels can be classified into different types according to the difference of the behavior characteristics of the user. Targeted services are provided to users based on the difference of these labels or behavior types, which makes the services more focused and personalized.

In the field of user profile technology, a recommendation method based on user statistical information (including one or more of: user age, gender, occupation, marriage, education level, health level, income, etc.) is an easy to implement recommendation method. For example, users are differentiated based on the age and gender, so that personalized recommendations are made for different types of users. However, the user statistical information (e.g., age and gender) is relatively difficult to obtain directly, so currently, the primary demographic information such as age and gender of the user is generally obtained by prediction technologies. The user statistical information above-described may also be referred to as the user demographic information or the user attribute.

Through analysis of the requirements of existing applications, the inventors of the present disclosure found that the development trends of information prediction technologies on demographic information (e.g., user age and gender and the like) are as follows.

First of all, user profiles are an important cornerstone for the evolution of modern personalized Internet services, and the implementation method of personalized Internet services based on user demographic information, such as age and gender, is easy to implement. Therefore, higher accuracy in prediction of demographic information (e.g., gender and age) is needed. Secondly, the user demographic information, such as age and gender, is core privacy information of a user, and user data for predicting age and gender also involves privacy of a user. At the same time, users pay more and more attention to the protection of their privacy. Therefore, preventing and avoiding of privacy leakage is a cornerstone of the benign development of personalized Internet services. Furthermore, user profiles may serve as a basic middle layer of terminal devices for serving, to provide services for different upper-layer applications. Therefore, there are new requirements for prediction methods in terms of universality and robustness.

In the related art, the prediction based on demographic information, such as user age and gender, is mainly classified into three types: (i) a prediction based on facial image recognition, (ii) a prediction based on user speech analysis, and (iii) a prediction based on mining of user activity data. Based on the increasing demands of service providers, equipment vendors, and users, the inventors of the present disclosure found that existing prediction techniques for predicting demographic information (e.g., user age and/or gender and the like) have various shortcomings or problems in terms of prediction accuracy, privacy control, universality, and robustness. For example, the following shortcomings or problems are identified below (which is not intended to be a limiting list).

1) The Accuracy of the Prediction is not High (or not High Enough):

Considering that the prediction for demographic information, such as age and gender, may be applied to more and more applications, and even may be used as a basic middle layer of the terminal system for serving, the user volume may be the user volume of the entire terminal, rather than that of a specific application, which means that the corresponding user volume is huge even if the accuracy is only increased by 1%, so a higher accuracy may be pursued, while the current prediction accuracy still needs to be improved.

2) There is No Universality and Robustness:

Photographing and recording are not allowed in some scenarios or environments, and the number of users who can authorize the image and voice prediction are also limited in consideration of the risk of privacy leakage, so there are universality problems in the prediction based on image and voice. In addition, photographing of an image and a recording of a voice are susceptible to environmental factors to produce noise, so there are also robustness problems in the prediction based on image and voice.

In order to solve at least one of the plurality of problems in the existing prediction technologies, an embodiment of the present disclosure provides a method for predicting a user attribute, where it may be understood that the user attribute includes but is not limited to basic information of a user, such as demographic information (e.g., age and gender), and further may include other user attribute(s), such as an occupation of the user. That is, the prediction method provided by the embodiment of the present disclosure can be configured to predict various user attribute(s) according to practical application requirements.

As the above two identified problems exist in the technologies of the related art that predict the information such as age and gender, the purpose of the present disclosure is to provide a method with higher accuracy, universality and robustness for predicting a user attribute, such as age and gender. It is further desirable to be able to use the user profile as a basic middle layer, in the system-level, of the terminal device for serving based on these methods, so that different upper-layer applications can provide various personalized application-level services for the user by invoking the service after the user's authorization. Through this solution, it is possible to effectively reduce the necessity of each upper-layer service capturing a large number of user data for prediction (i.e., reduced processing load, and/or reduced network throughput/bandwidth requirements), so that the equipment manufacturer has the possibility of obtaining the personalized services from the service provider, thereby protecting the user's privacy while reducing the difficulty of terminal equipment compliance.

Specifically, the present disclosure adopts deep learning techniques, and predicts a user attribute, such as user age and gender, based on information, including one or more of: a name of the user, application (APP) usage information, and/or a sleep pattern. In view of the problems existing in the related art, the present disclosure adopts the following methods to solve these problems, and the solution(s) is/are as follows.

1) How to Improve the Accuracy of Age and Gender Predictions

Firstly, in terms of data, the present disclosure proposes a method for more finely recording and extracting the APP usage pattern of the user. Secondly, the present disclosure is the first to incorporate a user sleep pattern into the prediction of the user attribute (such as age and gender). Lastly, the present disclosure proposes a joint prediction approach by combining various types of information, such as two or more of: a user's name, APP usage pattern, or a sleep pattern.

In terms of a prediction method (also called a prediction algorithm or a prediction pattern): firstly, based on an internal correlation between a same type of data and a correlation between different types of data, a new deep neural network may be designed to fully extract correlations between the data. Specifically, a weight of the cross feature may be creatively used to express the correlation between the data, and a specific method of learning the cross weight is proposed. Secondly, in order to fully extract the implied information in the data, the present disclosure proposes to use latent variables to learn and express the weights of specific data.

The deep neural network proposed by the embodiments of the present disclosure may also be referred to as a deep neural network model, a deep learning network, a deep learning model, a deep network model, and the like.

2) How to Improve the Usability and Universality of a Prediction Method

Since the solution provided by the present disclosure may not use image data and voice data for user attribute prediction (because they are limited by scenario and are susceptible to the environment (of course, they can also be used when they are available)), but uses the user activity data (that are not easily changed and can be obtained without applying for special authorization), such as the user's name, the APP usage pattern, and a sleep pattern. Therefore, the solution provided by the embodiment of the present disclosure does not require any permission to obtain data, that is without any authorization (e.g., less burdensome processing (s)). The acquisition of the original data is not easily affected by external environmental factors, and the process of obtaining the data is not sensed by the user and does not disturb the user. Therefore, the solution of the present disclosure has good universality and robustness.

The technical solutions of the present disclosure and how the technical solutions of the present disclosure solve the above technical problems are described in detail in the following specific embodiments. The following specific embodiments may be combined with each other, and the same or similar concepts or processes may not be described in some embodiments. Embodiments of the present disclosure will be described below with reference to the accompanying drawings.

FIG. 1 is a flowchart diagram illustrating a computer-implemented method for predicting a user attribute according to an embodiment of the present disclosure. A computer-implemented method meaning a method implemented by an electronic device, such as a computer or smartphone, etc. As shown in FIG. 1, the computer-implemented method may include the following operations:

S110: Obtain Demographic-Related Information of a user (or of multiple users). For example, an electronic device (or server) may obtain demographic-Related Information of a user (or of multiple users).

S120: Identify features corresponding to the input of the demographic-related information of a user and a weight corresponding to each of the features. For example, the electronic device (or server) may identify features corresponding to the demographic-related information of the user and the weight corresponding to each of the features. According to an embodiment, the features corresponding to the input of the demographic-related information may comprise: a single feature corresponding to the input of the demographic-related information of the user, and/or a cross feature between at least two single features.

S130: Predict a user attribute based on each of the features and their corresponding weight(s). For example, the electronic device (or server) may predict a user attribute based on each of the features and their corresponding weight(s).

According to an embodiment, transmit the predicted user attribute or content related to the predicted user attribute. For example, content related to the user attribute may be transmitted to a user terminal associated with the user (e.g., a user terminal used by the user). For example, the electronic device (or server) may transmit, to the user terminal, the predicted user attribute or content related to the predicted user attribute.

According to an embodiment, the input of demographic-related information includes input information associated with the user, such as information related to activity (e.g., real world activity) of the user including, for example, operation information of the user on the terminal device, or some information related to the terminal device used by the user. In the embodiment of the present disclosure, the input of the demographic-related information may specifically include some available non-sensitive or non-private data of the user, and may also include data authorized or permitted by the user. That is, according to the prediction method of the present disclosure, there is no restriction on what type of input data to use, and the prediction method can accept different types of data sources. Therefore, if the user agrees or authorizes, the present disclosure can also use various types of information related to the user that can be obtained for prediction, such as feature-extracted facial image, voice data, and the like, which will further improve the prediction accuracy of the present disclosure.

According to an embodiment, as an alternative, the input of demographic-related information may include at least one of the following: a name of the user (e.g., a full (or partial) legal name or a username, device usage information of a user on the terminal device during a set time period, a sleep pattern of a user during the set time period, a user image, user voice data, user social relationship data, and the like.

After obtaining the input of demographic-related information, its corresponding feature may be obtained according to the obtained input of the demographic-related information, and the feature may include at least one of the single feature and the cross feature. The cross feature may be a cross feature of two or more single features.

The cross feature can reflect the interaction information between multiple single features corresponding thereto. Therefore, the cross feature can be used when predicting the user attribute to improve the accuracy of the prediction.

In a practical application, since information included in the different single features and the importance of information are generally different, in the prediction scheme provided by the embodiment of the present disclosure, once the user attribute is predicted based on the single feature, the weight corresponding to each single feature may also be separately determined, so that different single features play different roles in the prediction of a user attribute. Similarly, since the cross feature is a representation of the interaction information between multiple single features, information included in different cross features and the importance of the information are generally different, so when the user attribute is predicted based on the cross feature, the weight corresponding to each cross feature may also be determined, so that different cross features may also play different roles.

The method for predicting a user attribute provided by the embodiment of the present disclosure can implement a prediction based on each feature corresponding to the input of demographic-related information and the weight corresponding to each feature when performing user attribute prediction. Based on the weight, the scheme can make different features play their respective roles in the prediction, so as to better meet the practical prediction requirements and improve the prediction effect.

In an optional embodiment of the present disclosure, the user attribute may include user age and/or user gender, etc. In addition to age and gender, other user attribute (i.e., statistical information of a user, such as occupation, relationship status (e.g., marriage status), education level, health level, income) is also applicable to the technical solutions of the present disclosure, and within the protection scope of the technical solutions of the present disclosure.

In an optional embodiment of the present disclosure, determining weight corresponding to each feature may include:

determining an input of weight corresponding to each feature; and determining a weight corresponding to each feature, according to the input of weight corresponding to each feature.

The input of weight is the information which can affect the weight. In the embodiment of the present disclosure, the input of weight may be specifically determined based on the feature, so that the determination of the corresponding weight can be implemented based on information included in each feature itself. If the weight is obtained based on the deep neural network, the input of weight can also be regarded as the input information of the deep neural network. That is, each feature is processed first to obtain the input of weight, and then through the deep neural network, the weight corresponding to each feature is obtained based on the input of weight.

In an optional embodiment of the present disclosure, determining input of a weight corresponding to each feature may include:

determining an input vector corresponding to each feature; and determining the input of weight corresponding to each feature, according to the input vector corresponding to each feature.

Specifically, for each feature, the input of weight corresponding thereto may be determined based on the input vector corresponding to the feature. The specific operation of determining the input vector corresponding to the feature may be configured according to actual requirements, in theory, as long as the input vector can represent the information included in the corresponding feature.

In an optional embodiment of the present disclosure, determining an input vector corresponding to each single feature may include:

for each single feature, determining the input vector corresponding thereto according to the single feature and its corresponding latent vector;

and/or determining an input vector corresponding to each cross feature may include:

for at least two single features corresponding to each cross feature, determining the input vector corresponding to the single feature according to the single feature and its corresponding latent vector, and determining the determined at least two input vectors as the input vector corresponding to the cross feature.

That is, for each single feature, the input vector of the single feature may be determined based on the feature and its corresponding latent vector. For each cross feature, the input vector thereof may be determined based on the input vector of each single feature corresponding thereto, which may be determined according to the single feature and its corresponding latent vector similarly.

In the optional solution provided by the present disclosure, when determining the weight of each feature, a latent vector (also referred to as a latent feature vector) of single feature corresponding to the feature may be used to learn the input vector of each single feature. Since the latent feature vector contains some latent information about the feature (i.e., implicit information), and the latent information contributes to learn the weight. For example, if a single feature is used to represent the usage information of a user on an APP, the latent feature vector corresponding to the single feature may be interpreted as the function composition information of the APP. For example, the APP may have 70% of functions as chatting, 20% of functions as call, 10% of functions as payment, etc. Therefore, the scheme of determining the input vector based on the single feature corresponding to the feature and the latent vector of the single feature can better learn the weight of each single feature or cross feature corresponding to the single feature, so the accuracy of the prediction can be improved.

Optionally, the foregoing determining the input vector corresponding to the single feature according to the single feature and its corresponding latent vector may specifically include:

multiplying the single feature value by the latent vector corresponding thereto, to obtain the input vector corresponding to the single feature.

In an optional embodiment of the present disclosure, the input of weight is an input matrix capable of characterizing the relationship between elements of input vectors.

It should be noted that, in a practical application, for a single feature, the above each input vector may be input vector corresponding to the single feature, that is, the input of weight of a single feature is an input matrix capable of characterizing the relationship between elements of input vectors corresponding to the single feature. For example, the input vector of the single feature is a, and the input of weight may be an correlation matrix capable of characterizing the relationship between elements in a. For the cross feature, the input of weight is a correlation matrix capable of characterizing the relationship between elements of input vectors of multiple single features corresponding to the cross feature. For example, it is assumed that, for the cross feature b, the single feature corresponding thereto is feature $a_1$ and $a_2$, then the input of weight corresponding to the cross feature is an correlation matrix capable of characterizing the relationship between elements in input vector of $a_1$ and elements in input vector of $a_2$.

The solution provided by the embodiment of the present disclosure can effectively learn the interaction information between the elements of the corresponding positions and that between the elements of the non-corresponding positions of each input vector. Compared with the existing method that the input of weight is only determined based on the interaction information between the elements of corresponding positions while ignoring the interaction information between the elements of the non-corresponding positions, the method of the present disclosure can learn more and more accurate input of weight, which can further improve the accuracy of prediction.

In an optional embodiment of the present disclosure, the input of weight corresponding to each feature is determined according to the input vector corresponding to each feature may include:

for each feature, an outer product operation is performed on the input vector corresponding to the feature; and the result of the outer product operation is determined as the input of weight corresponding to the feature.

Specifically, as an optional manner, for one feature, the corresponding input of weight can be obtained by directly calculating an outer product on the input vector corresponding to the feature. Since the outer product of the two input vectors is also a matrix, the interaction information between the input vector can be captured by the outer product operation, so that more accurate input of weight is obtained based on the operation result.

It should be noted that, for single feature, another input vector corresponding to the feature may be same as one input vector corresponding to the feature. In this case, the above outer product is the outer product of the input vector itself, that is, the outer product operation is performed on the input vector and itself. For example, for a single feature of which the input vector is a, the input of weight may be a result of performing outer product operation on a and a.

In an optional embodiment of the present disclosure, determining the weight corresponding to each feature according to the input of weight corresponding to each feature may include:

determining the weight corresponding to each feature according to the input of weight corresponding to each feature through the weight learning network.

In a practical application, for each feature (the single feature and/or the cross feature), after determining the input of weight corresponding to the feature, the input of weight may be input into the trained weight learning network, through which the weight corresponding to each feature is obtained.

Optionally, when the feature includes the single feature and the cross feature, a first weight learning network corresponding to the single feature and a second weight learning network corresponding to the cross feature may be a same neural network, or different neural networks.

As an alternative, the first weight learning network and the second weight learning network may be the same neural network.

In a practical application, if the first weight learning network and the second weight learning network apply the same neural network, when training the weight learning network, the single feature and the cross feature can be used simultaneously to learn the parameters of the model, to make the learned model parameters more accurate, and the weight corresponding to the single feature and the cross feature is separately predicted by the trained weight learning network. Based on the scheme, by multiplexing the weight learning network, the correlation relationship between the single feature and the cross feature can be further established, and the accuracy of the prediction is improved.

It should be noted that the specific network structure of the weight learning network may be configured according to actual requirements, for example, the weight learning network may be a shallow neural network or a deep neural network.

In an optional embodiment of the present disclosure, the weight learning network may include: a feature extraction module that performs feature extraction on the input of weight; and a weight learning module that predicts weight corresponding to feature according to the extracted feature.

It should be noted that the specific network structures of the feature extraction module and the weight learning module may also be configured according to actual requirements. For example, each module may include one or more corresponding network layers. For example, the feature extraction module may specifically include one or more convolution layers, and the weight learning module may include one or more fully connected layers.

Based on the scheme, the feature extraction module (such as the convolutional neural network) can be used to extract the local high-order features of the input of weight, so that the weight of each feature can be better predicted based on the extracted high-order features.

In an optional embodiment of the present disclosure, the feature extraction module performs feature extraction on the input information by using at least two convolution parameters; and/or, the weight learning module includes at least two fully connected layers that are cascaded in sequence.

The convolution parameters may include, but is not limited to, the sizes of convolution kernels, the number of channels of the convolution layer, and the like. In a practical application, multiple convolution parameters may be used to capture multiple different features corresponding to the input of weight. For example, at least two convolution parameters may be two types of the sizes of convolution kernels, so that feature of different regions corresponding to the input of weight can be learned through the feature extraction module. For example, the feature extraction module can include multiple convolution and pooling layers, and each convolution layer can contain convolution kernels in different dimensions, to correspond to different convolution parameters. The sizes of the convolution kernels and the number of convolution kernels in the convolution and pooling layer, and the parameters of each layer can be set in advance.

The weight learning module may be implemented by a fully connected layer structure. The input of this structure is the output of the feature extraction module, that is, the extracted feature, and the output of this structure is the weight. The weight learning module with multiple-layered cascaded fully connected layer structures is used, where the multiple fully connected layer structures can better fit complicated functions with respect to the single fully connected layer structure, thereby enabling better learning of weight of feature.

In an optional embodiment of the present disclosure, the weight learning network may be a deep learning network.

In an optional embodiment of the present disclosure, the user attribute may be predicted according to each feature and its corresponding weight, which may include:

determining each weighted feature, according to the weight corresponding to each feature; and predicting a user attribute based on each weighted feature.

Specifically, after the weight corresponding to each feature is determined, the feature may be fused according to its corresponding weight, for example, which may be the weighted summation process specifically, to obtain the fused feature, and the user attribute is predicted based on the fused feature.

Optionally, the user attribute may be predicted according to the weighted feature, which may include:

each weighted feature and the set offset information being added together, and the user attribute is determined based on the result obtained by the addition operation.

It can be understood that, in a practical application, after the result of the addition operation is obtained, the user attribute may be predicted by applying the pre-configured prediction network corresponding to the user attribute to be predicted, based on result of the addition operation according to the actual user attribute that is required to be predicted.

Specifically, for example, for the prediction on the user gender, since it is a binary classification, a binary classification prediction method may be adopted. For example, a sigmoid function may be specifically used, and in this case, the user gender is predicted through the sigmoid function according to the result of the above mentioned addition operation, wherein the output of the sigmoid function may be a probability value. After predicting the probability value, the user gender may be determined according to the comparison result of the probability value and the set threshold. If the probability value is greater than the set threshold, then the user gender is male; if the probability value is not greater than the set value, then the user gender is female.

For the prediction on user age, since the age prediction result can be an age range or an age value, the corresponding prediction method can be configured according to the actual application requirements. For example, a softmax function may be used, which may map the result of the addition operation to a column vector, and each element in the column vector may correspond to a pre-divided age group. The element value of each element in the column vector may specifically be the probability that the age of the user is within an age group corresponding to each element, and the age group corresponding to the element with the highest probability value can be determined as the age group of the user according to the column vector.

It should be noted that, in a practical application, after identifying each feature and the weight corresponding to each feature, the specific implementation manner of predicting the user attribute based on the information may be various and optional, and is adjustable or configurable for different requirements.

As an alternative, the prediction method provided by an embodiment of the present disclosure may be implemented by using a user attribute prediction model, and the user attribute prediction model may include the weight learning network, and may further include:

a latent vector determining module, which is configured to identify a latent vector of each single feature;

an input determining module, which is configured to identify an input vector corresponding to the single feature according to the single feature and its corresponding latent vector, and/or, for at least two single features corresponding to each cross feature, to identify an input vector corresponding to the single feature according to the single feature and its corresponding latent vector, then the identified at least two input vectors are identified as the input vector corresponding to the cross feature; and to identify an input of weight corresponding to each feature according to the input vector corresponding to each feature;

a weight learning network, which is configured to identify a weight corresponding to each feature according to the input of weight corresponding to each feature;

an attribute predicting module, which is configured to identify each weighted feature according to the weight corresponding to each feature, and to predict a user attribute according to each weighted feature.

Specifically, based on the user attribute prediction model being applied, since each module and/or each network part of the model may be taken as a whole, an end-to-end training can be used to train all parameters of the model, and all model parameters can be learned synchronously. Furthermore, model parameters can be learned simultaneously by using a single feature and a cross feature to make the learned parameters more accurate, so that the prediction accuracy can be further improved when the user attribute is predicted based on the trained model.

In an optional embodiment of the present disclosure, the input of demographic-related information may include one or more of: the user's sleep pattern, and/or device usage information of the user on a terminal device.

The sleep pattern may specifically refer to the one or more of: a user's wakeup time and bedtime, a duration of sleep, and a frequency of sleeping. Generally speaking, the user sleep pattern may have a certain correlation with a user age, user gender, and the like. For example, older people are more likely to have a more regular sleep pattern, such as sleeping at 22:00 every day, getting up at 6:00, whether on weekdays or weekend. However, a student (i.e., a younger person) may have different sleep patterns on different days (e.g., weekdays and weekend), for example, the student may sleep at 23:00 and get up at 8:00 on weekdays, but the bedtime may be postponed until 24:00 and the wakeup time may be postponed until 10:00 on weekend. Therefore, the user sleep pattern can be used to assist in predicting the age and gender of the user. This application can effectively improve the accuracy on predicting of the user attribute such as user age and gender, by introducing user sleep pattern to the user profile system, that is, the prediction for the user attribute.

In an optional embodiment of the present disclosure, the device usage information may include at least one of usage time, usage duration, and the number of usages.

In an optional embodiment of the present disclosure, identifying each feature corresponding to the input of demographic-related information may include:

jointing representation vector corresponding to the user's sleep pattern and/or the representation vector corresponding to the device usage information to obtain each single feature corresponding to the input of demographic-related information.

Specifically, for each obtained input of demographic-related information, the representation vector of each user attribute may be respectively identified, and the corresponding feature vector information may be obtained by jointing the obtained representation vectors, where each element in the feature vector information can be used as one piece of a single feature. According to an embodiment, a cross feature can be obtained by at least two single features, and, as a specific example, can be a product of at least two single features.

The specific manner of determining the representation vector of each the input of demographic-related information may be selected according to actual requirements. For example, the corresponding vector coding manner may be selected according to the information type of the related information to convert the information into the representation vector. For example, for the user name, the corresponding representation vector can be obtained by applying a One-Hot representation, a Bag-of-Words Representation, etc., and for the device usage information of the user on terminal device, the corresponding representation vector can be obtained by applying a binary coding (i.e., Binary representation).

It should be noted that, according to the foregoing prediction scheme provided by the embodiment of the present disclosure, the input of demographic-related information may include, but is not limited to, the user's sleep pattern, the device usage information, and the like, and may further include other obtained the input of demographic-related information, such as user name and user image. In addition, the specific manner of determining the representation vector of each the input of demographic-related information is not limited in the embodiment of the present disclosure, and the solution of prior art may be used, or the scheme for determining the representation vector of each the input of demographic-related information provided in the following embodiments of the present disclosure may be used.

The above mentioned user's sleep pattern and/or device usage information of the user on terminal device, specific optional implementation for predicting user attribute based on each information, and corresponding technical effects will be described in detail in the embodiments described below, and will not be described here.

Figure 2:
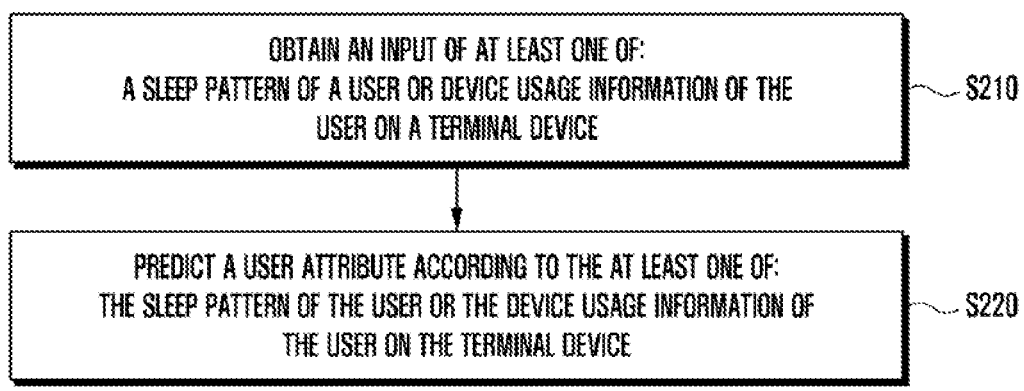
FIG. 2 is a schematic flowchart diagram illustrating a method for predicting user attribute according to another embodiment of the present disclosure.

The embodiment of the present disclosure further provides a method for predicting user attribute. As shown in FIG. 2, the prediction method may specifically include:

Operation S210: Obtain an input of at least one of: a sleep pattern of a user or device usage information of the user on a terminal device. For example, an electronic device (or server) may obtain at least one of: a sleep pattern of the user or device usage information of the user on the terminal device.

Operation S220: Predict a user attribute(s) according to the at least one of the sleep pattern of the user or the device usage information of the user on the terminal device. For example, the electronic device (or server) may predict a user attribute(s) according to the at least one of the sleep pattern of the user or the device usage information of the user on the terminal device.

According to an embodiment, transmit the predicted user attribute or content related to the predicted user attribute. For example, the electronic device (or server) may transmit, to the user terminal, the predicted user attribute or content related to the predicted user attribute.

As can be seen from the foregoing description, the sleep pattern may include, for example, a wakeup time and a bedtime. The user sleep pattern has a great correlation with the user age, gender, and the like. Therefore, the user sleep pattern can be used to predict the user attribute such as the user age and gender. This application can effectively improve the accuracy on predicting of the user attribute, such as user age and gender, by introducing a user sleep pattern to the user profile system, that is, the prediction for the user attribute.

In a practical application, when predicting user attribute, since a lot of user information, such as the user's facial image and voice information, is very sensitive and private, it is difficult for the terminal provider or the service provider to convince the user to authorize the use of the facial image and voice information to predict age and gender. Even if the user authorizes the use of the facial image and voice information, the implementation must provide a sufficiently secure and compliant private data management solution, which will cause significant challenges to the manufacturer in terms of technical solutions and operational costs.

In addition, theoretically, a service can only use the user data of the service itself, and can only analyze the user activity within the service. However, different services may have different user data, and user activity habits in different services may also different, which causes the service provider to need to capture more user data, record user activities as much as possible to obtain more permission, and even share data and collaborate between different services, in order to improve the accuracy. These behaviors greatly endanger the privacy of users, infringe the rights of users, and also bring great risks to the service provider.

Because the user's facial image and voice data are very sensitive and private, and additional camera and microphone permissions are required to obtain them, the prediction method provided by the embodiment of the present disclosure can predict the user attribute based on the input of demographic-related information, such as a user's sleep pattern and device usage information, which does not require special access permission. In the actual operation process, a pre-processing operation such as desensitization and encryption can be performed on the raw data in the term of data storage, so as to reduce the risk of privacy leakage.

These designs reduce the possibility of privacy leakage and reduce the difficulty of compliance from the source for this application.

In an optional embodiment of the present disclosure, obtaining a user's sleep pattern may include:

obtaining device status information of the terminal device;

determining the user's sleep pattern according to the device status information.

Wherein, the device status information may include screen off time and screen on time of the device.

In order to obtain the user sleep pattern, in the present disclosure, the user terminal device (on the terminal side) may collect the data about screen off and screen on of the terminal for a period of time, specifically the screen off time and the screen on time, and the terminal or the server (the terminal will send the collected data to the server) may make a deep analysis on the screen off and screen on time, so that the user's sleep pattern during the period can be obtained by estimating.

Specifically, determining the user's sleep pattern during the set period according to the device status may include:

taking each screen off time and the corresponding screen on time as a first candidate section, merging different first candidate sections which are continuous and the interval of which is less than the fourth set value to obtain each second candidate section; deleting the merged second candidate section that satisfies any deletion condition, and obtaining a third candidate section, wherein the deletion condition includes that the interval of sections is smaller than a first set value or the interval of sections is greater than a second set value;

determining a daily wakeup time and a bedtime based on the screen off time and the screen on time of each third candidate section of each day; and determining the user's sleep pattern during the set period according to the daily wakeup time and bedtime.

In real life, because the user's terminal device is usually in a state of screen off when a user sleeps at night, the interval between the two screen on times, which are before and after the sleep state respectively, is long (e.g., longer than a threshold value), while the switching between the screen on and screen off states is relatively frequent in the non-night sleep state of the user. Therefore, based on the screen off time and the screen on time of the terminal device, the user's wakeup time and bedtime can be determined.

Specifically, in the foregoing solution provided by the embodiment of the present disclosure, the corresponding screen off time and screen on time may be adjacent one screen off time point and one screen on time point, that is, the adjacent screen on moment and the screen off moment, which can correspond to a time section (i.e., the first candidate section). Since the duration corresponding to the first candidate section should be within a relatively reasonable long duration (e.g., longer than a threshold value) (corresponding to the second set value) and the duration may not be too short (corresponding to the first set value) when the user is in the sleep state. If the duration of the section is less than the first set value or greater than the second set value, the section may be considered as the section corresponding to the non-sleep state and can be deleted, so as to determine the daily wakeup time and bedtime based on the daily corresponding candidate sections after deleting.

In an optional embodiment of the present disclosure, determining the user's sleep pattern during the set period according to the device status information may specifically include:

determining the user's sleep pattern in at least two different scenarios according to the device status information and a preset scenario division rule.

In a practical application, since the user sleep patterns in different scenarios differ a lot. For example, for most users, the sleep patterns on weekend and on weekdays are usually different. Therefore, in order to improve the accuracy of determined sleep pattern, the user's sleep pattern in different scenarios in the set time period can be determined based on the device state information in different scenarios in the set time period.

In an optional embodiment of the present disclosure, the device status information may further include motion status information of the device, wherein the deletion condition further includes:

the device being in a non-stationary state and the duration of the non-stationary state of the device being greater than the third set value, wherein whether the device is in a non-stationary state is determined based on the motion state information of the device.

Since the terminal device is in a stationary state at the time of bedtime, and the terminal device is usually in a motion state during the non-sleeping time, in order to improve the accuracy of the determined user sleep pattern, the motion state information of the terminal device may also be referred to further filter the above candidate sections.

In an optional embodiment of the present disclosure, the device usage information may include, but is not limited to, at least one of usage information of user on the terminal application (e.g., when the user uses which APP, and how long the user uses it, etc.) and user's web browsing information (mainly may include, but not limited to, usage information generated by the user's behaviors, such as searching, browsing when browsing webpages). The device usage information may include at least one of usage time, usage duration, and the number of usages.

In an optional embodiment of the present disclosure, predicting the user attribute according to the device usage information, specifically may include:

determining device usage information of the user in at least two different states based on the device usage information and the preset division rule; and predicting the user attribute based on the device usage information in each state.

The foregoing division rules include, but are not limited to, a scenario division rule and/or a time division rule.

At present, mobile phones, packet assembler/disassembler (PAD)s and other terminal devices have become one of the most frequently used devices in people's daily lives, and multimedia applications such as various APPs and web pages have become indispensable parts of people's daily lives. A large number of APPs can satisfy people's different requirements. Therefore, a large amount of application usage information is generated on the terminal device every day, such as APP operation behavior data, web browsing data. These behavior datum are closely related to the user's life or work status, and the user's APP operation behavior data can reflect the user characteristics, such as the user's personal preference and behavior pattern, and these user characteristics are often strongly correlated with other factors, such as the user's age, and user' gender. Therefore, the user's APP behavior data on the terminal device can be used to describe the user profile, such as predicting the user age and gender, and deducing the user's hobbies.

At present, it is known that some user profile systems use the binary representation (i.e., 0-1) to characterize the user's APP usage pattern on the terminal. However, this representation can only indicate whether the user has used the APP for a period of time, but does not consider useful information such as when and how long the user uses. Therefore, this rough APP usage pattern does not have good discrimination degree, that is, it cannot reflect the difference of APP usage behaviors between different users. For example, in the case that both User A and User B have used an APP for a period of time, the User A only spends a small amount of time in normal evenings, but the User B spends a lot of time on the application every day. However, when taking the binary representation, the app usage patterns of these two users are the same.

Generally speaking, users in different ages and genders have different APP usage patterns, which may be as follows:

1) Men and women may spend different times or durations on a certain application. For example, both women and men use a shopping APP, but women may spend significantly more time on the shopping APP;

2) Older people and young people may also spend significant different times or durations on a certain APP. For example, older people generally have a more regular life and fall asleep earlier, so they will not use their mobile phones after 23:00. Young people are likely to use a variety of APPs until late at night.

In addition, the same user may also show different APP usage patterns at different time points (or context). For example, most people need to work or study during the day on weekdays, and rest at home at night, so it is quite likely to show different APP usage behaviors when the user is working or at home; in addition, users often switch between different states, such as commuting, working or learning, and eating, and may show different behavior modes in various scenarios. Therefore, user's APP usage pattern is closely related to time point (or context).

Based on the above considerations, the present disclosure provides a more elaborate representation of APP usage pattern, that is, device usage information of user on terminal device. Specifically, in an optional manner, the representation takes into account information such as the specific time point, usage duration, and number of usages when the user uses the application and/or browses the webpage, so that the user's application or webpage usage patterns can be more refined and more detailed, and the user's personalized features which can better reflect the user may be obtained. In another optional manner, considering the description in the foregoing, even if it is the same user, the device usage information of user on terminal device is likely to be different at different times or in different scenarios. According to the actual application requirements, a certain division rule can be configured, and based on the division rule, the prediction for user attribute can be realized based on device usage information of users with more finer granularity in different states, thereby improving the prediction effect.

Optionally, predicting the user attribute according to the input of demographic-related information, including:

jointing representation vector corresponding to the user's sleep pattern and/or the representation vector corresponding to the device usage information; and predicting the user attribute according to the jointed feature.

In a practical application, the specific manner of determining the representation vector of each the input of demographic-related information is not limited in the embodiment of the present disclosure, and may be configured according to actual requirements, as long as the determined representation vector can well represent each user information. For example, the corresponding vector conversion method can be configured according to the type of information. For the device usage information of the user on terminal device, when the device usage information includes the usage duration, the representation vector corresponding to the usage duration can reflect the duration information, and the representation vectors corresponding to the different usage durations can reflect the duration information of different durations and the duration relationship between different durations.

Optionally, when there are user's sleep patterns in at least two different scenarios, the representation vector corresponding to the user's sleep pattern may include a representation vector of the sleep pattern in each scenario, and similarly, when there is the device usage information in at least two different states, the representation vector corresponding to the device usage information may include a representation vector of the device usage information in each state. For example, the days may be divided according to the weekdays and the weekend, and a representation vector of the user's usage data on the APP in the working day, and a representation vector of the user's usage data on the APP in the weekend in a certain period of time can be determined; for another example, a day may be divided into multiple time periods, and the representation vector of the device usage information of the user at each different time period in the day is determined. After determining the vector corresponding to each input of demographic-related information, the feature for predicting the user attribute can be obtained by jointing the vectors.

Optionally, the user attribute includes user age and/or user gender.

It should be noted that, in the embodiment of the present disclosure, when the user attribute is predicted according to the feature obtained by the jointing, the prediction manner may be specifically implemented by applying prior art based on the method of obtaining the feature provided by the embodiment of the present disclosure, and also may be implemented by applying the method shown in FIG. 1 of the present disclosure. That is, the two prediction manners shown in FIG. 1 and FIG. 2 of the embodiment of the present disclosure may be used in combination with each other or may be used alone.

In order to better understand the solution provided in the embodiments of the present disclosure, the solutions described in the foregoing are described and explained below in conjunction with some specific examples. In the following descripted examples, for convenience of description, the weight may also be referred as a weight factor.

In an example embodiment, the "first name" of a user (or in the user name) may be taken as an example to explain the manner of determining the representation vector of the input of demographic-related information.

Generally speaking, the user's real name (e.g., legal name) may consist of two parts, last name and first name, and the part of the first name often implies the user gender. For example, the names of Chinese women often include common words such as "婷", "丽" and "娟", while male names often include common words such as "强", "丽" and "强"; Korean women's names are mostly "수아(秀雅)", etc., and men's names are mostly "철수(哲洙)"; the women's names in English-speaking countries are mostly "Lily", "Amy", etc., while the men's names are mostly "Mike", "Michael" and so on.

In addition, the names of people from different eras have certain era features, and the names of people in each era have certain commonalities. Therefore, the names of users can also reflect the era in which users were born to a certain extent. That is, the name of user has a correlation with the age.

In order to make full use of the user's name information, the user's name is encoded in a vectorized manner in this application. In this example, two different encoding methods are described:

1) One-hot coding: in this way, if the user's first name is regard as a whole, assuming that all users have a total of n different first names, each first name is assigned a unique index value in certain order within the ranges [0, n−1], if the index value is 0, it corresponds to the first name. Then, any first name of user can be expressed as a vector with dimension of 1*n, that is, a row vector with 1 row and n column, in which the value of the bit corresponding to the first name of the user is set to 1, and the value of the remaining bits is 0. For example, for a first name "爱国", assuming its index value is 1, then it can be represented as a vector like this:

$$\begin{bmatrix} 0 & 1 & 0 & \ldots & 0 \\ 爱民 & 爱国 & 建军 & & 富贵 \end{bmatrix}$$

In this example, the first name "爱国" corresponds to an index value of 1, that is, the second name in n different names, only the value of the second element of the representation vector is 1, and the values of the remaining elements are 0.

2) Bag-of-Words coding: unlike One-hot coding, the Bag-of-Words coding model does not consider the user's first name as a whole, but considers the first name as separate characters. For example, the first name "爱国" is split into two Chinese characters, "爱" and "国", and each independent character is encoded. Assuming that the first names of all users have a total of m different Chinese characters, similarly, each Chinese character can be assigned a unique index value in certain order with value range of [0, m−1]. Then, any user first name can be expressed as a vector with dimension of 1*m. In the vector, the value of the corresponding index bit of the Chinese character included in the user first name is 1, and the value of the remaining bits is 0. For example, for the first name "爱国", assuming that the indexes of the Chinese characters "爱" and "国" correspond to 0 and m−1, respectively, the first name can be expressed as a vector as follows:

$$\begin{bmatrix} 1 & 0 & 0 & \ldots & 1 \\ 爱 & 民 & 军 & & 国 \end{bmatrix}$$

It should be noted that, in a practical application, different representation vector coding manners may be configured according to different practical application scenarios. For example, for the languages like Chinese and Korean, each of the above two encoding formats can be used in this example, but in general, Bag-of-Words coding has better universality than the one-hot coding, for example, it is assumed that user first name consists of a common word and a rare word, if the first name is considered as a whole, since the first name is relatively rare, it is difficult to learn useful information, so the effect of one-hot coding is not good, but if Bag-of-Words coding is applied, the information of common words can be used to make subsequent predictions; however, for languages like English, each word consists of multiple independent English characters, and the individual English character does not have any special meaning, therefore, regarding to the above two methods, it is more suitable to be represented by one-hot coding method.

Of course, in a practical application, the example is applicable to an application scenario that can obtain the "first name" of the user. For example, the user has already input his/her first name in the "Account" service of the terminal device or the application installed on the terminal device, and allows the name information thereof to be used for the description of the user profile. If the "first name" of the user is not obtained, the prediction of the user attribute can be performed based on the other obtained the input of demographic-related information of the users.

In an example embodiment, taking the determining the vector representation of the usage duration in various states based on the usage duration of the user on terminal device according to the scenario (weekdays or weekend) and the time period (different time periods every day in different scenarios) as an example, the scheme for determining representation vector of related information will be described below. Specifically, taking the average duration of using the APP in different time periods or in different scenarios in a certain period as an example, the representation vector of the average duration of using the APP in different time periods in each scenario is obtained, and the expression of usage information of user on the APP is realized by the determined representation vector. For example, the following information can be reflected:

1) User A used an APP for about 15 minutes on average, from 12:00 to 18:00 in each weekday in past period of time;

2) User B used an APP for about 90 minutes on average, from 18:00 to 24:00 in each weekend in past period of time. This representation provides more information to be input for subsequent age and gender predictions and, therefore, can help improve the accuracy of predictions.

Specifically, the manner of determining the representation vector used to characterize the APP usage information provided in this example is as follows:

1) First, classifying the types of dates, for example, classifying dates into weekday or weekend or, of course, into Monday, Tuesday, . . . , Sunday, or every day.

2) Secondly, dividing 24 hours of each day into several recording periods. For example, every 6 hours can be an section, so each day can be divided into 4 time periods of [00:00, 06:00), [06:00, 12:00), [12:00, 18:00) and [18:00, 24:00). Of course, other division manners can be applied, such as division by hour. In this example, the divided time period is represented by the symbol $T_i$, wherein the value of i is 1 to 4, and $T_1$ represents the first time period, that is, the time period from 0 to 6 o'clock every day.

3) According to the analysis for the collected user's APP usage behavior data, that is, the usage information of user on the APP, during a statistical period (for example, in the past 30 days), the time when the user uses an APP in the recording time period $T_i$ is added together, so that the total time when the user uses an APP in the recording time period $T_i$ is obtained.

In this example, a vectorized representation method is used to represent the total time when the user uses all APPs in the recording time period $T_i$. Assuming that there are total of n APPs, each APP can be numbered sequentially from 0 to n−1 in certain order, then, the total time of each APP used by the user during the recording time period $T_i$ can be expressed as a vector with length of n, and each bit in the vector represents the total time when the user uses the corresponding APP. In an example shown in Table 1, the total time of APP used by the user during 4 different time periods in weekday is shown. For example, for the time period $T_2$, the total usage time of the user on the first 5 APPs among n APPs is 0, 10 minutes, 60 minutes, 5 minutes, 20 minutes, respectively.

TABLE 1

Recording user's APP usage by date type and time period

| Date type | Time period (divide by 6 hours) | Total App usage time (in minutes) |
| --- | --- | --- |
| Weekdays | $T_1$[00:00, 06:00) | [0, 0, 0, 0, 0, . . .] |
|  | $T_2$[06:00, 12:00) | [0, 10, 60, 5, 20, . . .] |
|  | $T_3$[12:00, 18:00) | [40, 0, 50, 0, 30, . . .] |
|  | $T_4$[18:00, 24:00) | [10, 60, 20, 20, 10, . . .] |

It can be understood that, in a practical application, the collection of APPs may adopt different selection methods, such as selecting all the statistical APPs and continuously updating the collection, where n is equal to the number of all APPs, and all APPs may be filtered according to certain rules to select a certain number of the most effective APPs.

4) In each date type, dividing the user's total usage time in the recording time period $T_i$ by the total number of times that $T_i$ of this date type appears in the statistical period can obtain the average usage duration of the user in $T_i$ of the date type 5) According to the above several steps, the APP usage of each user can be calculated. After obtaining the APP usage of all users, a normalization operation by column (or, by row) may be performed on values in the vector in each recording time period to limit the value range to [0, 1]. Optionally, the normalization operation may be performed by using a Min-Max Normalization method, and the mathematical expression of the normalization operation is:

$$v_{new} = \frac{v - \min}{\max - \min}$$

Where v is the original value, i.e., the value before normalization operation, and max and min respectively represent the maximum and minimum values in a column of elements.

6) Finally, all the vectors of different time periods of each date type of each user can be joined together to become a unified vector, which becomes the final expression form of the user APP usage information, that is, a vector of the user APP usage information in a certain period represents the representation vector.

Figure 3:
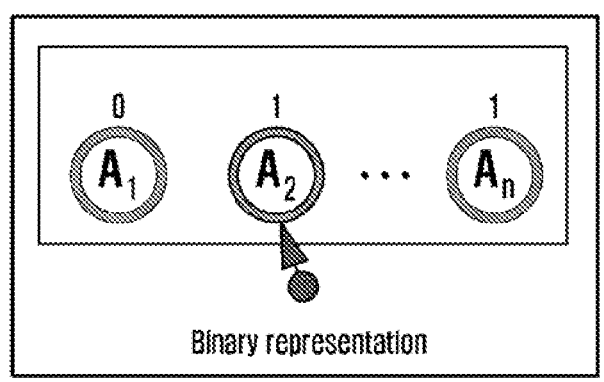
FIG. 3 is a schematic diagram illustrating an existing representation vector for determining an application usage pattern.
Figure 4:
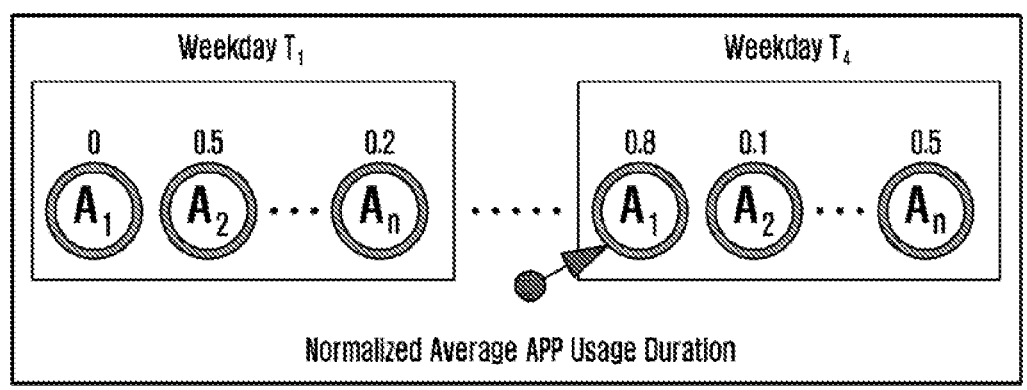
FIG. 4 is a schematic diagram illustrating a representation vector for determining application usage pattern according to an example of the present disclosure.

As an intuitive example, FIGS. 3 and 4 intuitively show an example of the difference between the user APP usage information in existing binary representation and that with the representation proposed by the embodiment of the present disclosure. FIG. 3 indicates the user APP usage information in the binary representation, where $A_i=1$ indicates that the user has used the i-th APP in the statistical period; $A_i=0$ indicates that the user has not used the i-th APP in the statistical period; FIG. 4 indicates the user APP usage information in the representation proposed by the embodiment of the present disclosure, where the representation can respectively represent weekday and weekend, where a day is divided into four time periods of $T_1$, $T_2$, $T_3$, and $T_4$ by 6 hours, the average usage duration information on certain application (in this example, the normalized duration) is recorded in each time period. It can be intuitively seen from FIGS. 3 and 4 that the representation proposed by the present disclosure contains more refined information, which will contribute to improve the prediction accuracy for the user attribute, relative to the binary representation.

In an example embodiment, the manner in which the user sleep pattern is determined based on the state information of the terminal device will be described in detail.

In order to obtain the user sleep pattern, the screen off data, the screen on data, and the motion data of the terminal device within a period of time on the terminal side may be firstly collected, and the user sleep pattern is determined based on the obtained data, as follows:

1) First, the screen off/on data of user terminal can be filtered to remove some noise data, for example, the screen on data caused by pushing of system message;

2) The filtered screen off/on data is constituted to a small candidate section according to [screen on time, screen off time];

3) These candidate sections are combined according to certain rules, for example, if the interval between two continuous sections is less than 10 minutes, then the two sections are merged;

4) The merged sections are filtered again, for example, the sections with the time span less than 2 hours or more than 16 hours are removed;

5) The sections are filtered again according to the motion data of the terminal, and the selected sections need to satisfy the condition that the duration of the non-stationary state of the terminal is less than certain threshold in the time range indicated by the section;

6) In the candidate section remaining after filtering, the median data of the screen on time and the screen off time is calculated, and the median data of the screen on time is set as the wakeup time in a certain day. Similarly, the median data of the screen off time is set as the bedtime of a certain day.

It should be noted that in a practical application, the wakeup time and the bedtime are usually time points, and the time point can be directly converted to the subsequent representation vector, but there is a problem that the data amount is too large. In order to facilitate data processing, after determining the wakeup time point of a certain day, the representation vector of the every hour on the hour closest to the time point can be used as the representation vector of the time point, or the representation vector of the time period in which the time point is located can be used as the representation vector of the time point. It is also possible to determine the representation vector to be used based on the pre-processed data, after some pre-processing is performed based on other pre-configuration methods. For example, for 8:15 am, the representation vector of 8:00 can be used as the representation vector of 8:15; since 8:15 is located between 8:00 and 9:00, the representation vector corresponding to the time period can be used as the representation vector of 8:15.

Figure 5:
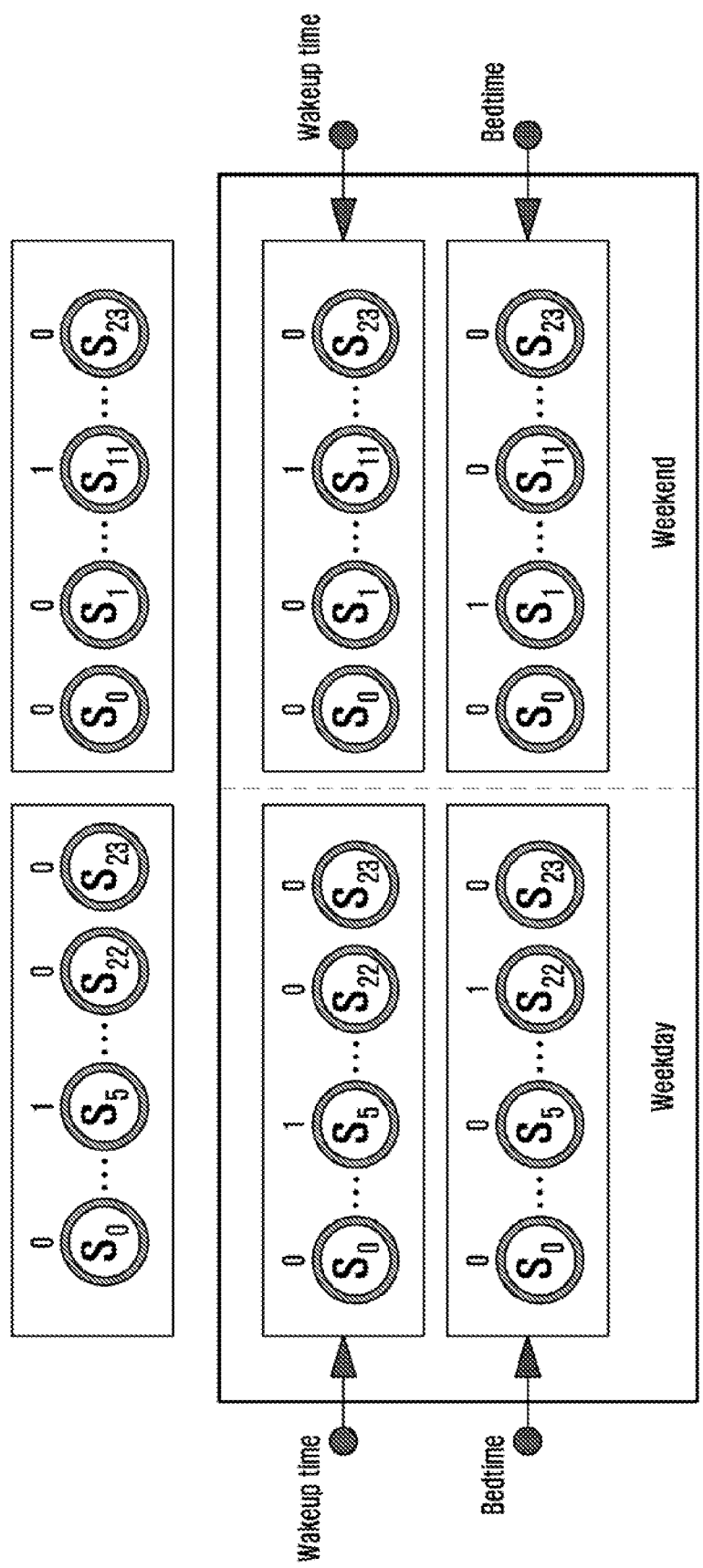
FIG. 5 is a schematic diagram illustrating a representation vector of user's sleep pattern according to an example of the present disclosure.

7) The average wakeup time and bedtime for each date type is calculated based on different date types. The dates types are classified as, for example, weekday or weekend, of course, can also be classified as Monday, Tuesday, . . . , Sunday;

8) In order to vectorize the user sleep pattern, in this example, 24 hours per day are divided into 24 sections by 1 hour, and a vector $\vec{s}=[S_0, S_1, \ldots S_{22}, S_{23}]$ is used to represent these 24 sections. For each date type, the bedtime and wakeup time are represented by the vector $\vec{s}$ respectively, which is encoded in one-hot coding in this example, and each date type contains two vectors. Table 2 shows an example of a user sleep pattern, as shown in the table below, assuming that the user goes to bed at the time period of [22:00, 23:00] and gets up at [05:00, 06:00] on weekdays, while goes to bed at the time period of [01:00, 02:00] and gets up at [11:00, 12:00] on weekend, then the vectorized representation of the user sleep pattern is shown in FIG. 5, for example, for bedtime [22:00, 23:00], the representation vector thereof is [0, 0, . . . , 1, 0].

TABLE 2

| Date type | Bedtime | Wakeup time |
|---|---|---|
| weekday | [22:00, 23:00] | [05:00, 06:00] |
| weekend | [01:00, 02:00] | [11:00, 12:00] |

It can be seen that in this example, the bedtime or wakeup time is represented by the time period in which the bedtime or wakeup time is located. For example, if the determined user's bedtime is between 22:00 and 23:00, then the representation vector of the bedtime can be represented as the above vector form. Of course, in a practical application, different time period division manners may be adopted as needed, for example, the division granularity can be further refined. Corresponding to the above-mentioned examples one to third, it is assumed that in the practical application, the name of the user, the usage information of the user on the APP on the terminal device, and the state information of the terminal device can be obtained (that is, the information of the user sleep pattern can be determined), after determining the representation vector corresponding to each information, the representation vector of the user's first name, the representation vector of the refined APP usage information, and the representation vector of sleep pattern may be joined together to form a feature vector of the user, to predict the user attribute, for example, using the feature vector as the input vector $\vec{x}$ of the neural network model for predicting age and gender to predict subsequent gender and age.

Note that in addition to the three types of data, which are the user name, the refined APP usage information, and the sleep pattern, the present disclosure may also utilize other user-related data such as the user's image and the user's voice data. As long as the characteristics of this data can be extracted by a certain method, and the vectorized expression is used, it will not be limited to those disclosed in the present disclosure.

In summary, the user attribute prediction method provided by the embodiment of the present disclosure can improve the prediction accuracy from two aspects, as below.

1. Utilization and Representation of Data

In terms of utilization of data, the present disclosure first proposes to use the user's sleep mode, that is, the sleep pattern, to predict gender and age. Since the user sleep pattern is related to user gender and age, the newly introduced part will help to improve the accuracy of prediction.

In terms of representation of data, a more refined representation method is provided in an optional embodiment of the present disclosure, compared with existing rough data representation method, such as a Chinese name and user's APP usage information, which can make the input vector contain more useful information and thus help to improve the accuracy of prediction.

2. Prediction Method

In terms of prediction methods, the present disclosure proposes a new prediction method (which may also be called a prediction algorithm or a prediction model), the key concept of which is to propose a new weight learning network. The weight learning network captures various interaction information between input vectors by outer product operation, and the learned weight of the features are more accurate by using techniques such as convolutional neural networks and multi-layer perceptrons in deep learning techniques, so that the accuracy of age and gender predictions is improved.

In a practical application, the method for predicting user attribute provided by the embodiment of the present disclosure may be specifically implemented by using the deep learning network. The above two aspects of the solution provided by the present disclosure are described in detail below with reference to specific examples. For convenience of description, the user age and user gender are described below as specific user attribute.

It should be noted that the prediction method provided by the present disclosure may be specifically performed by a server, or by a terminal device, or may be jointly performed by a terminal device and a server. For example, after some steps (such as the steps of determining user's sleep pattern) are performed by the terminal device, the execution result is sent to the server, and the server performs other steps based on the data sent by the terminal device.

In order to better understand the specific implementation of the solution of the embodiment of the present disclosure and the corresponding effects, the process of the existing scheme for predicting user age and gender is described below. The specific process is as follows:

1) Various types of user information and behavior data on the terminal side are collected, such as a user ID, APP usage behavior data and web browsing data, and upload them to the server.

2) The server side obtains the user's name through the user ID, and obtains the user's APP usage information and web browsing information by analyzing the user's APP usage behavior data, web browsing data, etc.

3) The feature vector $\vec{x}$ is formed by jointing the representation vectors of the user name, the APP usage information, and the web browsing information together.

4) The feature vector $\vec{x}$ is input to the prediction model as an input. The user age and gender are predicted based on prediction method of the model. The common prediction methods generally use linear support vector machine (Linear SVM) and Gradient Boosting Decision Tree, logistic regression, and Random Forest, and the like.

5) The output categories of age and name are set. It is assumed that the ages are divided into four categories, for example, the age groups from low to high: 1) less than 18 years old, 2) 18~34 years old, 3) 35~54 years old, 4) greater than 55 years old, i.e., one category corresponds to one age range; the output categories of name are: 1) male, 2) female.

The prediction scheme provided by the embodiment of the present disclosure is a new method for predicting age and gender proposed to further improve the accuracy of prediction under the premise of the existing prediction scheme with the low privacy risk, universality, and good robustness.

Figure 6:
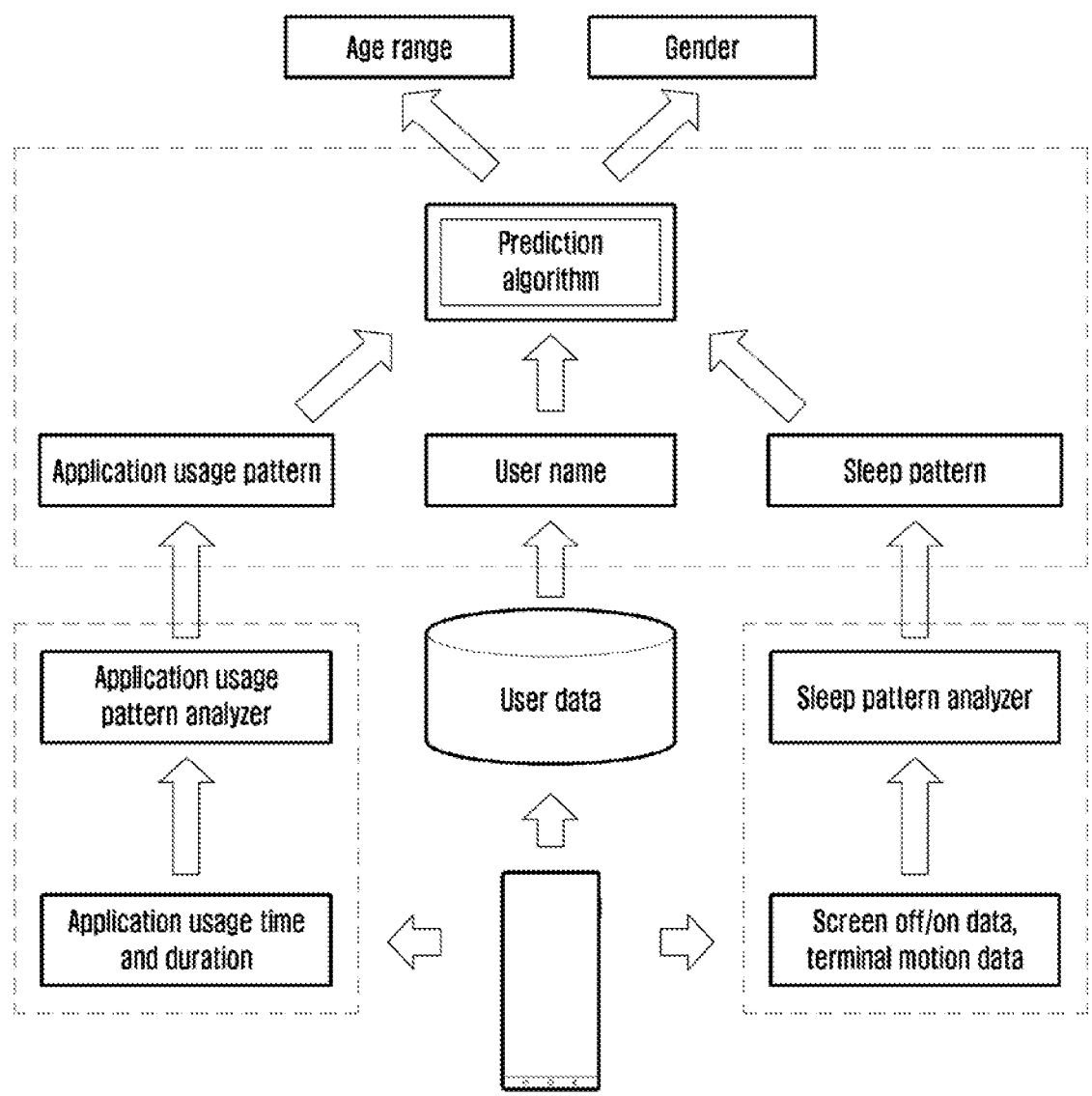
FIG. 6 is a schematic diagram illustrating a prediction system for user age and gender according to an embodiment of the present disclosure.

FIG. 6 is an overall block diagram illustrating an optional prediction system for age and gender according to the prediction method provided by the embodiment of the present disclosure. As shown in FIG. 6, the basic operation processes of the prediction system may include the followings.

1) The user ID and behavior data of user on terminal are collected on the terminal side, which may include, but is not limited to, the user's APP usage behavior data shown in the figure (including the information on what time and how long the user uses an APP, such as the application usage time and the duration shown in figure), the screen off/on time data of the terminal and the motion data of the terminal, and then upload the user ID and APP usage behavior data to the server for analysis. In the example, the screen off/on screen data of the terminal and the motion data of the terminal may be retained on the terminal side for analysis, as shown in FIG. 6, and of course, the screen off/on screen data of the terminal and the motion data of the terminal may also be uploaded to the server side to be analyzed by the server.

2) The server side can obtain the user name (if present) from the stored user data by querying the "Account" service (which can be understood as a user database for storing the mapping relationship between the user ID and the user name) through the user ID, extract the user first name from the user name (i.e., the user's last name is removed), and represent the user's first name is as a vector. The solutions provided in the prior art or the foregoing embodiments of the present disclosure may be adopted.

3) The application usage pattern analyzer in the server side obtains the average usage time of each user on each APP in different types of time period (for example, 6:00-12:00 on weekdays) by performing big data analysis on the APP usage information of all users in the past period of time (in this example, the application usage time and duration shown in the figure), and then filters and normalizes the data of all users to obtain the Normalized Average APP Usage Duration of the user in each type of time period, which can show the APP usage information better. At last, the analyzed data is represented in the manner of vectorization. The manner of obtaining the representation vector of the device usage information of the user on the terminal device (corresponding to the application usage pattern in the figure) may be obtained by the solution provided in the foregoing embodiments of the present disclosure.

4) The sleep pattern analyzer in the terminal side estimates the user sleep pattern by analyzing the screen off/on data of the terminal and the motion data of the terminal (that is, the motion data of the terminal described above) of the user in the past period of time. The user's wakeup and bedtime in different statistical modes are obtained, and also the user's sleep pattern is represented in the manner of the vectorization, as described in the previous embodiment.

5) The user name, the refined APP usage information of user, and the user's sleep pattern represented in the manner of the vectorization to form an input vector $\vec{x}$ for the prediction model.

6) The generated input vector $\vec{x}$ is input into the prediction model to predict the age and the gender of the user.

In the example below, it is assumed that ages are classified into four categories, namely: 1) under 18 years old, 2) 18 to 34 years old, 3) 35 to 54 years old, 4) 55 years old or older, i.e., each category corresponds one age range; while genders consist of only two categories: 1) male and 2) female.

Understandably, since the age prediction is a multi-classification, and the gender prediction is a binary classification, although the two prediction can share the same method, there are slight differences in how the method is designed or used, which will be clear to those skilled in the art. In addition, the number of age categories in the above description may be set according to actual requirements, and age categories may be further refined and classified into more categories. The number of categories in the above description and the age range corresponding to each category are only examples.

Since the age prediction is usually a multi-classification, and the results of the gender prediction only include two categories, namely male and female, so the gender prediction is a binary classification. Since the multi-classification can be regarded as an extension of the binary classification, the method of binary classification, that is, the method of the gender prediction, will be first introduced.

Figure 7:
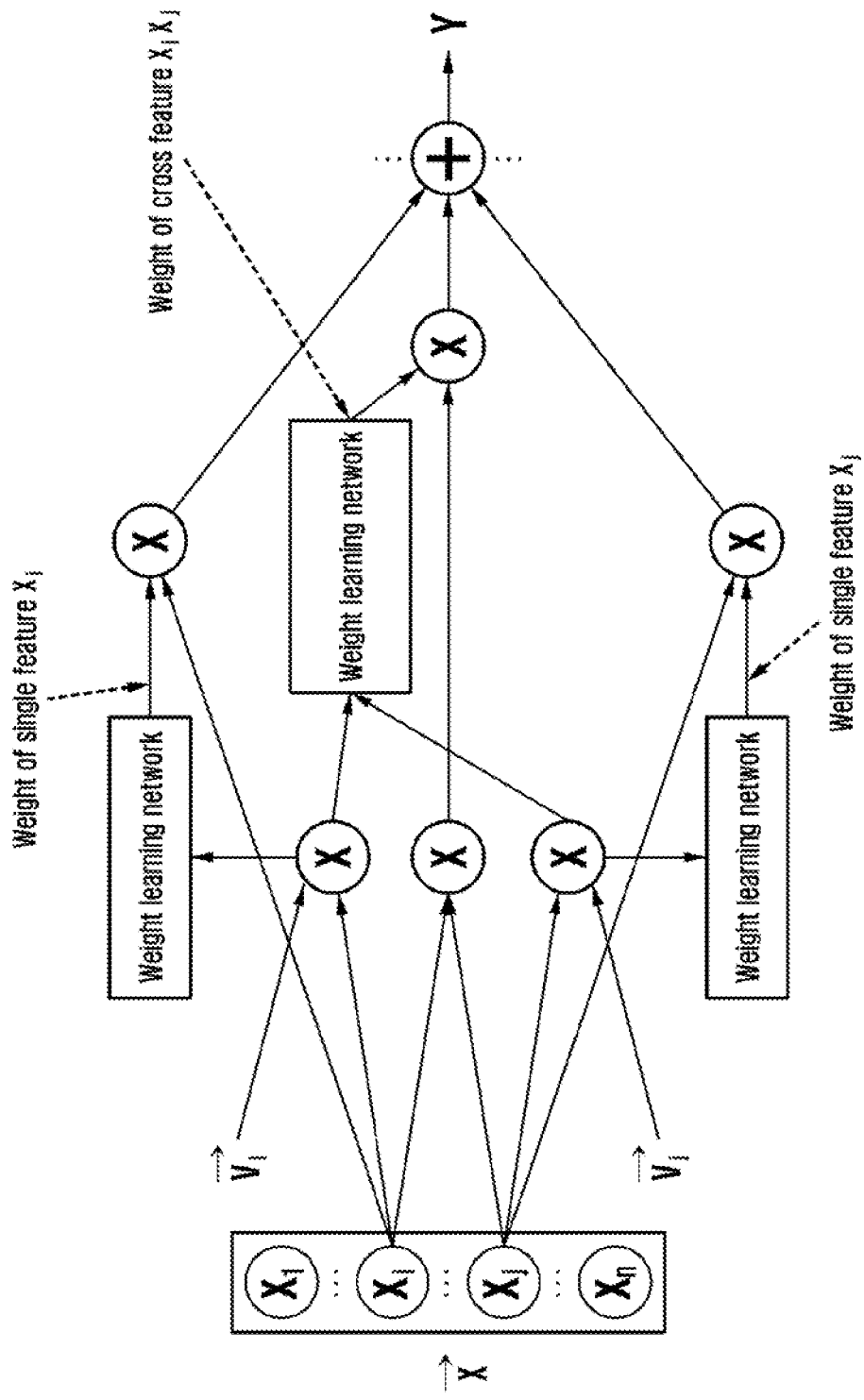
FIG. 7 is a schematic diagram illustrating a method for predicting user attribute according to an example of the present disclosure.

FIG. 7 is a schematic diagram illustrating the network structure of the gender prediction method. As shown in FIG. 7, the mathematical expression of the network structure can be expressed as:

$$y(\vec{x}) = w_0 + \Sigma_{i=1}^n f(x_i, \vec{v_i}, \vec{v_i}) x_i + \Sigma_{i=1}^n \Sigma_{j=i+1}^n f(x_i, \vec{v_i}, x_j, \vec{v_j}) x_i x_j \quad (1)$$

In the expression, z denotes an input vector of prediction method (which may also be referred to as a prediction algorithm or a prediction model), which is composed of representation vectors of a user name, refined APP usage information, and sleep pattern information, where $x_i$, $x_j$ represents the i-th single feature and the j-th single feature in the feature vector $\vec{x}$ respectively; similarly, each single feature $x_i \in \vec{x}$ corresponds to an latent feature vector $\vec{v_i} \in R^{1 \times d}$, where d is the space dimension of the latent feature vector; $w_0$ indicates a global offset.

Figure 8:
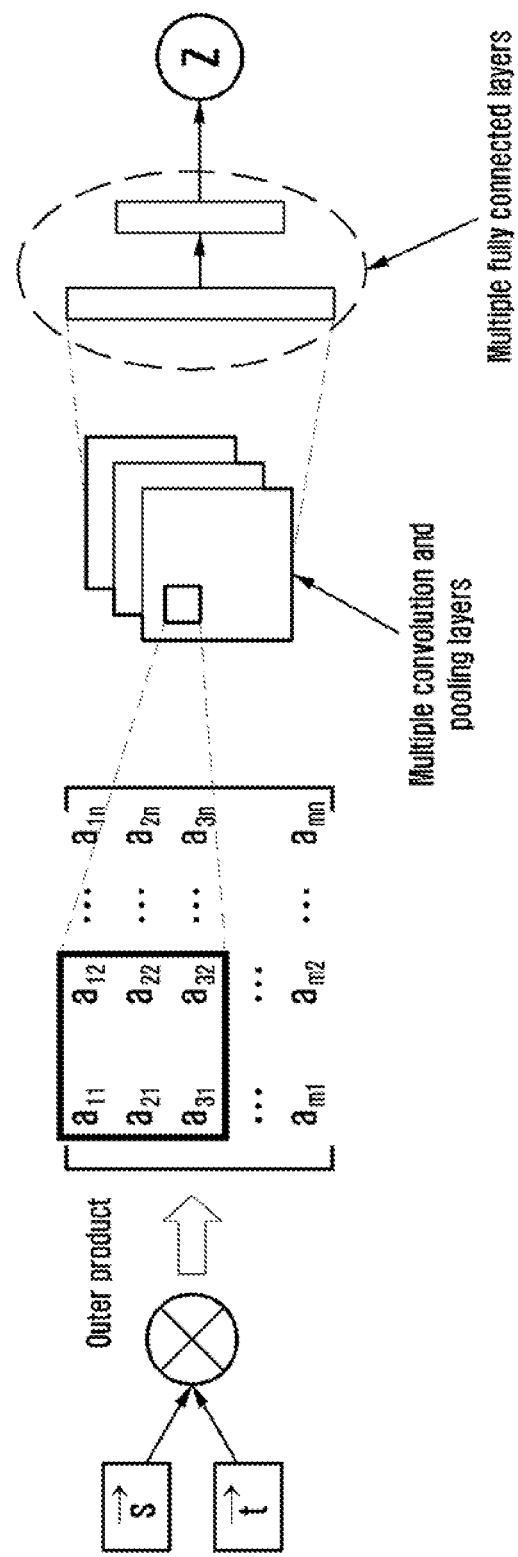
FIG. 8 is a schematic structural diagram illustrating a weight learning network according to an example of the present disclosure.

In addition, in the formula, f(.,.) represents a weighting learning network proposed by the present disclosure, and the weight learning network is used to learn the weights of a single feature and a cross feature, that is, in this example, the weight learning network for determining the first weight of the single feature and the weight learning network for determining the second weight of the cross feature are the same. For the convenience of description, the weight learning network is expressed as a function $z = f(\vec{s}, \vec{t})$. As an alternative, the network structure of the weight learning network is as shown in FIG. 8, where z is the output of the weight learning network. For the binary classification, z is a real value. For a multi-classification, z can be a column vector, and each element of the column vector corresponds to a classification category.

It can be seen from FIG. 8 that the weight learning network in this example may include an outer product calculation module, a feature extraction module, and a weight learning module which are sequentially cascaded. The feature extraction module includes a plurality of convolution modules (the convolution module may specifically include convolution and pooling layers, etc.), the sizes of the convolution kernels of each convolution module are different, and the weight learning module may include a multi-layered cascaded fully connected layer structure.

In the weight learning network, the data processing flow is as follows:

1) First, the outer product of the input vectors $\vec{s}$ and $\vec{t}$ is calculated. The result of the outer product is a matrix of dimension d*d. It is assumed that $\vec{s} = [s_1, s_2, \ldots, s_d]$, $\vec{t} = [t_1, t_2, \ldots, t_d]$, then the outer product of the vectors $\vec{s}$ and $\vec{t}$ is:

$$\vec{s} \times \vec{t} = \begin{bmatrix} s_1 t_1 & s_1 t_2 & \ldots & s_1 t_d \\ s_2 t_1 & s_2 t_2 & \ldots & s_2 t_d \\ \ldots & \ldots & \ldots & \ldots \\ s_d t_1 & s_d t_2 & \ldots & s_d t_d \end{bmatrix}$$

2) Next, the matrix is input into multiple convolution and pooling layers, each convolution layer can contain convolution kernels with different dimensions, the sizes of the convolution kernels, the number of the convolution kernels and parameters of each layer in the convolution and pooling layers can be determined empirically or experimentally;

3) All the outputs of the last convolution and pooling layer is flattened to get an intermediate vector;

4) The intermediate vector is input into a plurality of fully connected layers, and the number of fully connected layers and the number of nodes in each layer may be determined by empirical or experimental results;

5) Finally, the final result z is output.

The weight learning network and the weight learning method for a single feature in the prediction method of the embodiment of the present disclosure will be specifically described below:

1) Weight Learning Network

First, the weight learning network in this application can use an outer product to calculate the interaction relationship between two input vectors. The result of the outer product is a matrix, not a vector. The outer product has the following advantages with respect to an element-wise product:

a. by observing the specific mathematical formula of the outer product and the element-wise product, it can be found that the result of the outer product contains all the results of the element-wise product. Specifically, for two input vectors, the result of their element-wise product is all the elements on the main diagonal in their outer product matrix. Therefore, the outer product contains more information about the interaction between the two input vectors relative to the element-wise product. The added information is the interaction information between the non-corresponding bits of the two input vectors;

b. The result of the outer product is in a matrix form. Therefore, the advanced convolutional neural network (CNN) can be easily applied to extract advanced features and fit complex functions. Convolutional neural networks are widely used in the field of computer vision and have good effects.

Secondly, the weight learning network of the present disclosure can use a convolutional neural network to extract local high-order features in the outer product matrix, and different convolution kernels can be used to capture features of different regions in the matrix.

Furthermore, the weight learning network of the present disclosure finally adopts multiple fully connected layers instead of a single fully connected layer. In general, the multiple fully connected layers can better fit complex functions with respect to the single fully connected layer, thus enabling better learning of weight of feature.

In addition, the goal of the weight learning network of the present disclosure is to directly learn the weights of various features. The output result of the weight learning network is the learned weight, while an attention network needs to express the weight of the feature together with other factors. Therefore, the weight learning network is more targeted.

2) Learning the Weight of Single Feature

First, the prediction method of the present disclosure can learn the weight of a single feature $x_i$ based on the latent feature vector $\vec{v_i}$ corresponding to the single feature $x_i$. The reason for learning the weight of single feature using the latent feature vector is that the latent feature vector contains some latent information about features, which helps to learn weights. For example, if a single feature is the single feature corresponding to the APP usage information, then the latent feature vector corresponding thereto can be considered as representing of the functional composition information of the APP.

Secondly, it can be seen from the mathematical expression formula of the network structure of the present disclosure that the weight learning network proposed by the present disclosure can also be utilized in learning of the weight of single feature, the advantage of which is that the correlation between the single feature and the cross feature can be established by multiplexing weight learning networks. In this way, the parameters of the model may be learned by simultaneously using the information of the single feature and the cross feature (i.e., the latent feature vector and the weight learning network), and the learned parameters are more accurate, thus improving the accuracy of the prediction.

It should be noted that the specific embodiment manner of the prediction method provided by the embodiment of the present disclosure is not limited, and different processing manners may be adopted according to actual requirements.

As an optional transformation of the embodiment of the present disclosure, the expression of the prediction method of the present disclosure may be transformed into:

$$y(\vec{x}) = w_0 + \Sigma_{i=1}^{n} w_i x_i + \Sigma_{i=1}^{n} \Sigma_{j=i+1}^{n} f(x_i, \vec{v_i}, x_j, \vec{v_j}) x_i x_j \qquad (2)$$

By comparing the expression (1) with the expression (2), it can be seen that the difference between the expression (1) and the expression (2) is that in the learning of weight of single feature, a variable $w_i$ can be used to represent a weight of a single feature $x_i$. In this expression, the learning of single feature and cross feature are independent of each other. That is, when the solution of the present disclosure is implemented, the manner of learning weight of the cross feature can be the manner of determining the weight based on the latent vectors of the two single features corresponding to the cross feature provided by the embodiment of the present disclosure.

As another optional transformation of the embodiment of the present disclosure, the expression of the prediction method of the present disclosure may also be transformed as follows:

$$y(\vec{x}) = w_0 + \Sigma_{i=1}^{n} g(\vec{v_i}) x_i + \Sigma_{i=1}^{n} \Sigma_{j=i+1}^{n} f(x_i, \vec{v_i}, x_j, \vec{v_j}) x_i x_j \qquad (3)$$

By comparing the expression (3) with the expression (1), it can be seen that the difference between the expression (3) and the expression (1) is that, in the learning of weight of single feature, a customized function $g(\vec{v_i})$ can be used, where the independent variable of the function is $\vec{v_i}$, that is the latent vector of single feature. The specific form of the function can be set according to actual requirements. In this expression, the correlation between the learning of single feature and cross feature is built by $\vec{v_i}$. That is, when the scheme of the present disclosure is implemented, the weight of the single feature and the weight of the cross feature can be associated with the latent vector of the single feature, and both can be determined by the scheme of same principle, for example, they can be learned through the same weight learning network provided above, also can be learned by using different weight learning networks or weight learning functions.

Furthermore, when the solution provided by the embodiment of the present disclosure is implemented, the implementation of the method may be different for different user attributes to be predicted. For example, for two kinds of user attributes, that is, the age and gender, since the age prediction is a multi-classification, the binary classification method used for the gender prediction cannot be directly applied. However, based on the principle of the prediction method provided by the present disclosure, different concepts can be used to solve different classification. Two different concepts are taken as an example to illustrate the implementation of the method of the present disclosure: the first one is to adjust the binary classification method to make it adapt to the multi-classification; the second one is to convert the multi-classification into multiple binary classification. These two concepts are separately introduced below.

1. Adjusting of the Binary Classification Method

In the gender prediction method, since the output z of the weight learning network $z=f(\vec{s}, \vec{t})$ is a real value, it can only be used to solve the binary classification. Therefore, in order to adapt to the multi-classification, the output z of the weight learning network needs to be changed from a real value to a vector, and the length of the vector is equal to the number of categories, that is, if it is a multi-classification containing K categories, then the dimension of z is 1*K, and correspondingly, the variable $w_0$ also needs to be transformed into a vector with dimension of 1*K.

2. The Multi-Classification being Transformed into Binary Classification

In this idea, there is no need to modify the original formula, but to transform the multi-classification. There can be many different processing methods, such as one-versus-rest or one-versus-one, the two methods are explained below:

1) One-Versus-Rest Method

In this method, for the multi-classification with K categories, K different binary classification models can be constructed using the existing binary classification method. These K models classify samples of a certain category into one class during model training, and the remaining samples belonging to other categories are classified into another class. Therefore, it is equivalent to transforming the original K-classification into K binary classifications. In the model prediction, these K binary classification models will respectively predict the input vector $\vec{x}$ to obtain the final prediction category with highest score.

2) One-to-One Method

Different from the one-versus-rest method described above, for multi-classification including K categories, the one-to-one method will construct $$\frac{K*(K-1)}{2}$$

different binary classification models using the existing binary classification method. For each classification model, during training, the samples of two different categories can be selected for training. In the prediction phase, that is, the usage phrase after the training is completed, the $$\frac{K*(K-1)}{2}$$

binary classification models will respectively predict the input vector $\vec{x}$, and the class with the highest scores will be used as the final prediction category.

In the existing prediction methods, the prediction results are usually obtained based on the user activity data in a single service, and this prediction result can theoretically be used only in the service. The solution provided by the present disclosure implements the prediction for the user attribute at the terminal system level. Therefore, the solution of the present disclosure can provide the prediction service for information such as age and gender at the terminal system level, and the prediction result of the embodiment of the present disclosure may facilitate the development and operation of upper-level services and better meet the needs of practical applications.

Figure 9:
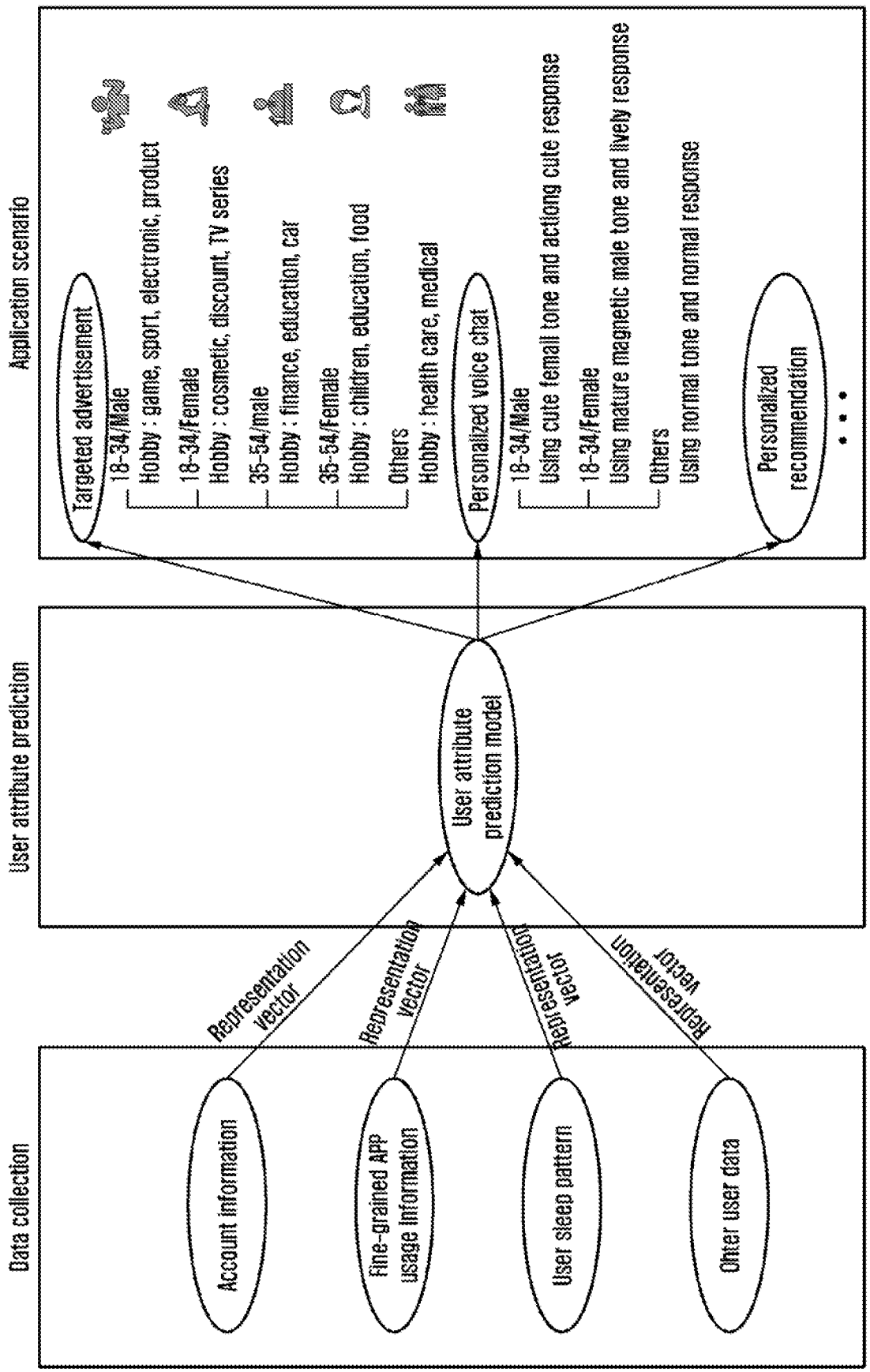
FIG. 9 is a schematic flowchart diagram illustrating a user attribute prediction and application according to an example of the present disclosure.

The prediction for various user attributes such as user age and gender has become more and more important in practical applications. As an example in practical application, FIG. 9 shows a schematic flowchart diagram, in which the input of demographic-related information is collected, and prediction for user age and gender is implemented based on the collected data, then a recommendation for personalized information is realized based on the prediction result. As shown in FIG. 9, the following processes may be mainly included in.

The first step is data collection, in which the input of demographic-related information is acquired. The input of demographic-related information may mainly include the user's account information, which may be user ID, and may be user name or other user identifiers, and the user name may be obtained by querying the user account database based on the identifier; the APP usage information is a type of device usage information. For the prediction scheme provided by the application, the input of demographic-related information may further include the user's sleep pattern (which may be determined according to the screen on/off time of the terminal device, etc.). In addition, the input of demographic-related information may also include other user data that can be obtained, such as a user's web browsing and search information.

Based on the solution provided by the embodiment of the present disclosure, for the obtained fine-grained APP usage information, such as the APP usage time and the usage duration, a representation vector corresponding to the fine-grained device usage information may be obtained. For the obtained user's sleep pattern, the representation vector corresponding to the user's sleep pattern is further obtained. Similarly, the representation vectors corresponding to the user name and the other user data can be determined. Then the representation vectors corresponding to various information can be jointed to obtain each single feature corresponding to the input of demographic-related information, and the cross feature is obtained based on the single feature. The prediction for user attribute (such as age and/or gender) can be implemented based on the prediction method (the user attribute prediction model shown in the figure) provided by the embodiment of the present disclosure. Compared with the prior art, the solution provided by the application embodiment can effectively improve the prediction accuracy.

In a practical application scenario, after predicting the user age and gender, the user can obtain personalized recommendation based on the predicted result. For example, targeted advertisements can be recommended to users of different ages and genders. In a schematic result as shown in the figure, advertisements related to games, sports, electronic products, etc. can be recommended to men aged 18-34 years old, and advertisements related to health care/medical products can be recommended to older users. In addition, different response modes can be used for users of different ages and genders in some response scenarios, such as in voice response scenarios (such as voice navigation, voice search and intelligent response system), as shown in the figure, in the case of personalized voice chat, the manner with cute female tone or acting cute response is recommended to men aged 18-34 for voice playing, and the manner with mature magnetic male tones and lively response is recommended to women aged 18-34 for voice playing, which also can be applied to other personalized recommendation scenarios. The solution provided by the embodiment of the present disclosure can effectively improve the accuracy on prediction, and can better improve the user experience in the practical application scenario. Corresponding to the method shown in FIG. 1, the embodiment of the present disclosure further provides a device for predicting user attribute, where the device includes an input information acquiring module, a feature determining module, and an attribute predicting module, wherein:

the input information acquiring module is configured to acquire the input of demographic-related information;

the feature determining module is configured to determine features corresponding to the input of the demographic-related information and a weight corresponding to each feature, wherein features corresponding to the input of the demographic-related information comprises a single feature corresponding to each input of demographic-related information, and/or a cross feature between the at least two single features; and the attribute predicting module is configured to predict user attribute according to each feature and its corresponding weight.

Optionally, when determining the weight corresponding to each feature, the feature determining module is specifically configured to:

determining an input of weight corresponding to each feature;

determining the weight corresponding to each feature according to the input of weight corresponding to each feature.

Optionally, when determining the input of weight corresponding to each feature, the feature determining module is specifically configured to:

determining an input vector corresponding to each feature;

determining the input of weight corresponding to each feature based on the input vector corresponding to each feature.

Optionally, when determining the input vector corresponding to each single feature, the feature determining module is specifically configured to:

for each single feature, determining the input vector corresponding thereto, according to the single feature and its corresponding latent vector;

and/or when determining the input vector corresponding to cross feature, the feature determining module is specifically configured to:

for at least two single features corresponding to the cross feature, determining the input vector corresponding to the single feature according to the single feature and its corresponding latent vector, and determining the determined at least two input vectors as the input vector corresponding to the cross feature.

Optionally, the input of weight is an input matrix capable of characterizing the relationship between elements of input vectors.

Optionally, when determining the input of weight corresponding to each feature according to the input vector corresponding to each feature, the feature determining module is specifically configured to:

for each feature, an outer product operation is performed between input vectors corresponding to the feature;

determining the result of outer product operation as the input of weight corresponding to the feature.

Optionally, when determining the weight corresponding to each feature according to the input of weight corresponding to each feature, the feature determining module is specifically configured to:

determining the weight corresponding to each feature according to the input of weight corresponding to each feature through weight learning network.

Optionally, the weight learning network includes: a feature extraction module that performs feature extraction on the input of weight, and a weight learning module that predicts weight corresponding to feature according to the extracted feature.

Optionally, the feature extraction module performs feature extraction on the input of weight by using at least two convolution parameters;

and/or the weight learning module comprises at least two fully connected layers that are cascaded in sequence.

Optionally, the weight learning network is a deep learning network.

Optionally, the attribute predicting module is specifically configured to:

determining each weighted feature according to the weight corresponding to each feature;

predicting the user attribute based on each weighted feature.

Optionally, the input of demographic-related information comprises user's sleep pattern, and/or device usage information of the user on terminal device.

Optionally, the device usage information comprises at least one of usage time, usage duration, and the number of usages.

Optionally, when determining each feature corresponding to the input of demographic-related information, the feature determining module is specifically configured to:

jointing an representation vector corresponding to the user's sleep pattern and/or an representation vector corresponding to the device usage information to obtain each single feature corresponding to the input of demographic-related information.

Optionally, the user attribute comprises user age and/or user gender.

Corresponding to the method shown in FIG. 2, the embodiment of the present disclosure further provides an apparatus for predicting user attribute, where the apparatus includes an input information acquiring module and an attribute predicting module, wherein:

the input information acquiring module configured to acquire the input of demographic-related information, where the input of demographic-related information comprises user's sleep pattern, and/or device usage information of the user on terminal device; and the attribute predicting module configured to predict user attribute according to the input of demographic-related information.

Optionally, the device usage information includes at least one of a usage time, a usage duration, and the number of usages.

Optionally, the attribute predicting module is specifically configured to:

jointing a representation vector corresponding to the user's sleep pattern and/or a representation vector corresponding to the device usage information;

predicting the user attribute according to the jointed feature.

Optionally, the user attribute comprises user age and/or user gender.

It is to be understood that the modules provided in the embodiments of the present disclosure may have the functions of implementing the corresponding steps in the methods provided by the embodiments of the present disclosure, in which the function can be implemented by hardware, or can be implemented by hardware performing software. Each of the above modules may be software and/or hardware, and each module may be implemented separately or multiple modules may be integrated. The description of function of each module of the prediction apparatus for the user attribute may refer to the corresponding description in the method in the foregoing embodiments, and details are not described herein again.

In addition, in the practical application, each functional module of the apparatus in the embodiment of the present disclosure may be run in the terminal device and/or the server according to practical application requirements.

Based on the same principle, an embodiment of the present disclosure further provides an electronic device including a memory and a processor, wherein the memory stores computer program; the processor is configured to invoke the computer program to perform the method provided by any embodiment of the present disclosure.

Based on the same principle, the embodiment of the present disclosure further provides a computer readable storage medium, wherein the storage medium stores computer program, when executed by processor, the computer program implements the method provided in any embodiment of the present disclosure.

Figure 10:
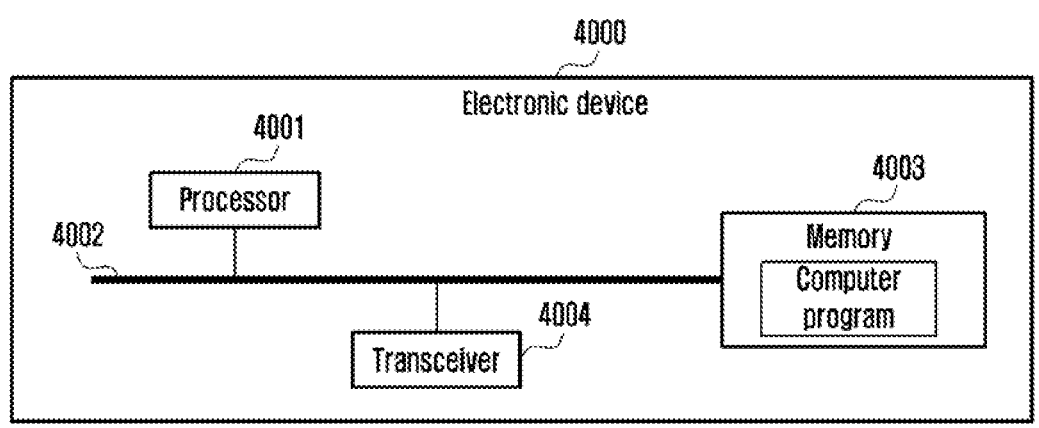
FIG. 10 is a schematic structural diagram illustrating an electronic device according to an embodiment of the present disclosure.

As an alternative, FIG. 10 shows a schematic structural diagram of an electronic device to which the embodiment of the present disclosure is applied. As shown in FIG. 10, the electronic device 4000 may include processor 4001 and a memory 4003. The processor 4001 is connected to the memory 4003, for example, through the bus 4002. Optionally, the electronic device 4000 may further include transceiver 4004. It should be noted that, in the practical application, the transceiver 4004 is not limited to one, and the structure of electronic device 4000 does not constitute a limitation on the embodiment of the present disclosure.

The processor 4001 can be a central processing unit (CPU), a general purpose processor, a digital signal processor (DSP), an application-specific integrated circuit (ASIC), a field-programmable gate array (FPGA) or other programmable logic device, a transistor logic device, a hardware component, or any combination thereof. The processor 4001 may implement or carry out the various illustrative logical blocks, modules and circuits described in connection with the present disclosure. The processor 4001 can also be a combination implementing computation function, for example, combination of one or more microprocessor, combination of DSP and microprocessor, and the like.

The bus 4002 can include path for communicating information between the components described above. The bus 4002 may be a Peripheral Component Interconnect (PCI) bus or an Extended Industry Standard Architecture (EISA) bus or the like. The bus 4002 can be classified into an address bus, a data bus, a control bus, and the like. For ease of representation, only one thick line is shown in FIG. 10, but it does not mean that there is only one bus or one type of bus.

The memory 4003 may be a read-only memory (ROM) or other type of static storage device that can store static information and instructions, a random-access memory (RAM) or other types of dynamic storage devices that can store information and instructions, or an electrically erasable programmable ROM (EEPROM), a compact disc ROM (CD-ROM) or other optical storage, optical disk storage (including a compact disc, a laser disc, optical disc, digital versatile disc, Blu-ray disc, etc.), magnetic disk storage media or other magnetic storage devices, or any other medium that can be used to carry or store desired program code in the form of an instruction or data structure and that can be accessed by a computer, but not limited to this.

The memory 4003 is configured to store a computer program that executes the solution of the present disclosure, and is controlled by the processor 4001 for execution. The processor 4001 is configured to execute a computer program stored in the memory 4003 to implement the content shown in any of the foregoing method embodiments.

It should be understood that although the various operations in the flowcharts of the drawings are sequentially displayed as indicated by the arrows, these steps are not necessarily performed in the order indicated by the arrows. Except as explicitly stated herein, the execution of these operations is not strictly limited, and may be performed in other sequences. Moreover, at least some of the operations in the flowcharts of the drawings may include a plurality of sub-operations or stages, which are not necessarily performed at the same time (although they may be performed by parallel computing), but may be executed at different times, and the order of execution thereof is not necessarily performed sequentially, but may be performed in turn or alternately with at least a portion of other operations or sub-operations or stages of other operations.

The above description is only a part of embodiments of the present disclosure, and it will be apparent to those skilled in the art that a number of improvements and modifications can be made without departing from the principles of the present disclosure, which should also be considered within the protection of this disclosure.

What is claimed is:

1. An operating method of an electronic device comprising:

obtaining demographic-related information of a user;

identifying a plurality of features corresponding to the demographic-related information of the user;

identifying a plurality of weights corresponding to the plurality of features that have a single feature type that corresponds to the demographic-related information, and a cross feature type that represents interaction information between at least two different single feature types, the at least two different single feature types including a first single feature type that is different from a second single feature type; and predicting a user attribute based on the plurality of features and the plurality of weights corresponding to the plurality of features, wherein a feature of the cross feature type is represented by a correlation that indicates a relationship between a first input of the first single feature type and a second input of the second single feature type.

2. The operating method according to claim 1, wherein the identifying the plurality of weights corresponding to the plurality of features comprise:

identifying, by using a deep neural network, a plurality of inputs for the plurality of weights by inputting the plurality of features into the deep neural network; and identifying the plurality of weights corresponding to the plurality of features according to the identified plurality of inputs for the plurality of weights.

3. The operating method according to claim 2, wherein the identifying the plurality of inputs for the plurality of weights corresponding to the plurality of features comprises:

determining a plurality of input vectors corresponding to the plurality of features; and identifying the plurality of inputs for the plurality of weights based on the plurality of input vectors corresponding to the plurality of features.

4. The operating method according to claim 3, wherein the determining the plurality of input vectors corresponding to the plurality of features comprises:

in a case that the plurality of features are the single feature type, determining the plurality of input vectors according to the single feature type and a latent vector corresponding to the single feature type; and in a case that the plurality of features are the cross feature type, determining the plurality of single feature type of input vectors according to the at least two different single feature types and two or more latent vectors corresponding to the at least two different single feature types, and determining at least two cross-feature input vectors, as the plurality of input vectors corresponding to the cross feature type of feature.

5. The operating method according to claim 4, wherein the plurality of inputs for the plurality of weights include an input matrix capable of characterizing a relationship between elements of input vectors.

6. The operating method according to claim 1, wherein the cross feature type is represented by a correlation matrix that indicates a relationship between elements in a first input vector of the first single feature type and elements in a second input vector of the second single feature type.

7. The operating method according to claim 1, wherein the demographic-related information comprises at least one of: a sleep pattern of the user, or device usage information of the user on a terminal device, the device usage information including at least one of usage time, usage duration, or a number of uses.

8. The operating method according to claim 1, wherein the demographic-related information includes a sleep pattern of the user, and the operating method further comprises:
obtaining the sleep pattern of the user, including a wake-up time and a bedtime, based on screen off/on times of a terminal device; and
predicting the user attribute based on the determined sleep pattern of the user.

9. The operating method according to claim 1, wherein the demographic-related information includes a sleep pattern of the user, and the operating method further comprises:
obtaining the sleep pattern of the user by:
obtaining at least one of application operation behavior data or web browsing data of the user; and
determining the sleep pattern of the user, including a wake-up time and a bedtime, based on the at least one of the application operation behavior data or the web browsing data of the user; and
predicting the user attribute based on the determined sleep pattern of the user.

10. The operating method according to claim 1, wherein the demographic-related information includes a sleep pattern of the user, and the operating method further comprises:
obtaining the sleep pattern of the user by:
obtaining at least one of application operation behavior data of the user, web browsing data of the user or status information of a terminal device of the user, the status information including at least one of: screen off/on times of the terminal device or motion information of the terminal device; and
determining the sleep pattern of the user, including a wake-up time and a bedtime, based on the at least one of the application operation behavior data of the user, the web browsing data of the user, or the status information of the terminal device; and
predicting the user attribute based on the determined sleep pattern of the user.

11. An operating method of an electronic device comprising:

obtaining demographic-related information of a user;

identifying one or more features corresponding to the demographic-related information of the user and identifying one or more weights corresponding to the one or more features, wherein the one or more features comprise at least one of: a single feature type that corresponds to the demographic-related information, or a cross feature type that corresponds to at least two single feature types, the at least two single feature types including a first single feature type that is different from a second single feature type; and predicting a user attribute based on the one or more features and the one or more weights corresponding to the one or more features, wherein the identifying the one or more features comprises:

performing an outer product operation on one or more input vectors corresponding to the one or more features; and determining a result of the outer product operation as one or more inputs of the one or more weights corresponding to the one or more features.

12. The operating method according to claim 11, further comprising:

determining the one or more weights corresponding to the one or more features according to the one or more inputs for the one or more weights corresponding to the one or more features through a weight-based learning network.

13. The operating method according to claim 12, wherein the weight-based learning network comprises: a feature extraction module that performs feature extraction on an input of weight, and a weight learning module that predicts a weight corresponding to a feature according to the feature extraction.

14. The operating method according to claim 13, wherein at least one of:

the feature extraction module performs the feature extraction on the input of weight by using at least two convolution parameters; or the weight learning module includes at least two fully connected layers that are cascaded in sequence.

15. The operating method according to claim 14, wherein the predicting the user attribute comprises:

determining one or more weighted features, according to the one or more weights corresponding to the one or more features; and predicting the user attribute based on the one or more weighted features.

16. The operating method according to claim 15, wherein the demographic-related information comprises one or more of: a sleep pattern of the user, or device usage information of the user on a terminal device.

17. The operating method of claim 16, wherein the device usage information comprises at least one of: a usage time, a usage duration, and a number of uses.

18. The operating method according to claim 17, wherein the determining the one or more features corresponding to the one or more inputs comprises:
  jointing a representation vector corresponding to the sleep pattern of the user or corresponding to the device usage information to obtain the at least two single feature types corresponding to the demographic-related information.

19. An electronic device comprising:
  a network communication interface; and
  a processor configured to:
    obtain demographic-related information of a user;
    identify a plurality of features corresponding to the demographic-related information of the user;
    identifying a plurality of weights corresponding to the plurality of features that have a single feature type that corresponds to the demographic-related information, and a cross feature type that represents interaction information between at least two different single feature types, the at least two different single feature types including a first single feature type that is different from a second single feature type; and
    predict a user attribute based on the plurality of features and the plurality of weights corresponding to the plurality of features,
  wherein a feature of the cross feature type is represented by a correlation that indicates a relationship between a first input of the first single feature type and a second input of the second single feature type.

20. A non-transitory computer readable storage medium, wherein the non-transitory computer readable storage medium stores a computer program, which when executed by a processor, causes the processor to:
  obtain demographic-related information of a user;
  identify a plurality of features corresponding to the demographic-related information of the user and identifying a plurality of weights corresponding to the plurality of features that have a single feature type that corresponds to the demographic-related information, and a cross feature type that represents interaction information between at least two different single feature types, the at least two different single feature types including a first single feature type that is different from a second single feature type; and
  predict a user attribute based on the plurality of features and the plurality of weights corresponding to the plurality of features,
  wherein a feature of the cross feature type is represented by a correlation that indicates a relationship between a first input of the first single feature type and a second input of the second single feature type.

* * * * *